United States Patent
Sanpei et al.

(10) Patent No.: US 8,997,130 B2
(45) Date of Patent: Mar. 31, 2015

(54) DISK CARTRIDGE FOR STORING DISK-SHAPED RECORDING MEDIA

(71) Applicant: Sony Corporation, Tokyo (JP)

(72) Inventors: Takaaki Sanpei, Miyagi (JP); Osamu Taguchi, Miyagi (JP); Shuichi Kikuchi, Miyagi (JP); Kazumoto Yatabe, Miyagi (JP); Takeshi Saito, Miyagi (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 14/074,252

(22) Filed: Nov. 7, 2013

(65) Prior Publication Data

US 2014/0133286 A1    May 15, 2014

(30) Foreign Application Priority Data

Nov. 14, 2012 (JP) ................................. 2012-250100

(51) Int. Cl.
  *G11B 23/03* (2006.01)
(52) U.S. Cl.
  CPC ........ *G11B 23/0323* (2013.01); *G11B 23/0328* (2013.01)
  USPC ....................................................... 720/728

(58) Field of Classification Search
  USPC ................. 720/614, 615, 655, 726, 727, 728; 369/192.1
  See application file for complete search history.

(56) References Cited

U.S. PATENT DOCUMENTS 5,200,938 A * 4/1993 Akiyama et al. ........... 369/30.83
2009/0055847 A1 * 2/2009 Hasegawa et al. ............ 720/614

FOREIGN PATENT DOCUMENTS

JP          02-053276 A    2/1990

* cited by examiner

*Primary Examiner* — Joseph Feild
*Assistant Examiner* — Gustavo Polo
(74) *Attorney, Agent, or Firm* — Sony Corporation

(57) ABSTRACT

There is provided a disk cartridge including a case body in which a plurality of disk-shaped recording media are configured to be able to be received in an axial direction of a central shaft in parallel, and a first shell having a base surface section parallel to a recording surface of the disk-shaped recording medium and a second shell having a basal surface section parallel to the recording surface of the disk-shaped recording medium are coupled and separated through separation and connection in the axial direction, and a presser spring having a section to be attached, which is attached to the case body, and a pressing section configured to come in contact with an outer circumferential surface of the disk-shaped recording medium and to press the disk-shaped recording medium. The presser spring is formed of a resin material.

17 Claims, 31 Drawing Sheets

1 · · · DISK CARTRIDGE
2 · · · CASE BODY
3 · · · FIRST SHELL
4 · · · SECOND SHELL
7 · · · BASE SURFACE SECTION
100 · · · DISK-SHAPED RECORDING MEDIUM

1 · · · DISK CARTRIDGE
2 · · · CASE BODY
3 · · · FIRST SHELL
4 · · · SECOND SHELL
7 · · · BASE SURFACE SECTION
42 · · · BASAL SURFACE SECTION
52 · · · PRESSER SPRING
100 · · · DISK-SHAPED RECORDING MEDIUM

1 · · · DISK CARTRIDGE
2 · · · CASE BODY
3 · · · FIRST SHELL
4 · · · SECOND SHELL
7 · · · BASE SURFACE SECTION
42 · · · BASAL SURFACE SECTION

42··· BASAL SURFACE SECTION
100··· DISK-SHAPED RECORDING MEDIUM

42··· BASAL SURFACE SECTION
100··· DISK-SHAPED RECORDING MEDIUM

52···PRESSER SPRING
53···SECTION TO BE ATTACHED
54···PRESSING SECTION

54 · · · PRESSING SECTION

4 ··· SECOND SHELL
42 ··· BASAL SURFACE SECTION
100 ··· DISK-SHAPED RECORDING MEDIUM

1 ··· DISK CARTRIDGE
3 ··· FIRST SHELL
4 ··· SECOND SHELL
42 ··· BASAL SURFACE SECTION
52 ··· PRESSER SPRING
100 ··· DISK-SHAPED RECORDING MEDIUM

3 · · · FIRST SHELL
4 · · · SECOND SHELL
100 · · · DISK-SHAPED RECORDING MEDIUM

3 ··· FIRST SHELL
4 ··· SECOND SHELL
7 ··· BASE SURFACE SECTION
42 ··· BASAL SURFACE SECTION

54··· PRESSING SECTION
100··· DISK-SHAPED RECORDING MEDIUM
102··· RECORDING SURFACE
103··· COVER LAYER

FIG. 25

1··· DISK CARTRIDGE
2··· CASE BODY
4··· SECOND SHELL
42··· BASAL SURFACE SECTION

1 · · · DISK CARTRIDGE
3 · · · FIRST SHELL
4 · · · SECOND SHELL
42 · · · BASAL SURFACE SECTION
52 · · · PRESSER SPRING
100 · · · DISK-SHAPED RECORDING MEDIUM

3 ··· FIRST SHELL
4 ··· SECOND SHELL
7 ··· BASE SURFACE SECTION
42 ··· BASAL SURFACE SECTION

3 ··· FIRST SHELL
4 ··· SECOND SHELL
7 ··· BASE SURFACE SECTION
42 ··· BASAL SURFACE SECTION

DISK CARTRIDGE FOR STORING DISK-SHAPED RECORDING MEDIA

CROSS REFERENCE TO RELATED APPLICATIONS

This application claims the benefit of Japanese Priority Patent Application JP 2012-250100 filed Nov. 14, 2012, the entire contents of which are incorporated herein by reference.

BACKGROUND

The present technology relates to a technical field of a disk cartridge, and more particularly, to a technical field of a disk cartridge including a case body having a first shell and a second shell, which are separable, and a presser spring configured to press a disk-shaped recording medium.

A disk cartridge configured to be able to receive a plurality of disk-shaped recording media in parallel in an axial direction of a central shaft thereof is provided. Such a disk cartridge is used in, for example, a disk reproducing apparatus for reproducing music, and a desired disk-shaped recording medium is extracted by an extraction mechanism to play music data recorded on the disk-shaped recording medium.

In addition, in recent times, a recording capacity of the disk-shaped recording medium has remarkably increased, and necessity of the disk cartridge used in a data center or the like, in which the plurality of disk-shaped recording media having a large recording capacity are configured to be received in parallel in the axial direction of the central shaft, has increased.

Among such disk cartridges as mentioned above, there is a type in which outer circumferential sections of the respective disk-shaped recording media are inserted and received in a pair of holding grooves. Since this type of disk cartridge may not provide a disk tray configured to hold the disk-shaped recording medium, a receiving space can be reduced to provide a compact structure and the number of receiving media can be increased to increase a stored data amount.

In addition, in the disk cartridge, there is a type in which a case body has a first shell and a second shell, which are separable, and in a state in which the first shell and the second shell are separated, reception and extraction of the disk-shaped recording medium with respect to the case body are performed (for example, see Japanese Patent Application Laid-open No. H02-53276).

In the disk cartridge disclosed in Japanese Patent Application Laid-open No. H02-53276, a presser spring (a holding spring) is attached to a case body, the respective disk-shaped recording media received in the case body can be pressed by the respective pressing section of the presser spring to be held at predetermined positions.

SUMMARY

However, in the above-mentioned type of disk cartridge in which the disk-shaped recording medium received in the case body is pressed by the presser spring, scratches or damage on the disk-shaped recording medium due to contact with the presser spring should be prevented.

In addition, while an appropriate pressing force should be applied from the presser spring to the disk-shaped recording medium such that the disk-shaped recording medium is held at a predetermined position, an excessive pressing force by the presser spring from being applied to the disk-shaped recording medium should be prevented such that distortion or deformation of the disk-shaped recording medium is not generated.

According to an embodiment of the present technology, there is provided to a disk cartridge configured to prevent the scratches or damage on the disk-shaped recording medium, and secure a holding state in which the disk-shaped recording medium is stabilized by the presser spring.

Firstly, there is preferably provided a disk cartridge including a case body in which a plurality of disk-shaped recording media are configured to be able to be received in an axial direction of a central shaft in parallel, and a first shell having a base surface section parallel to a recording surface of the disk-shaped recording medium and a second shell having a basal surface section parallel to the recording surface of the disk-shaped recording medium are coupled and separated through separation and connection in the axial direction, and a presser spring having a section to be attached, which is attached to the case body, and a pressing section configured to come in contact with an outer circumferential surface of the disk-shaped recording medium and to press the disk-shaped recording medium. The presser spring is formed of a resin material.

Accordingly, in the disk cartridge, the disk-shaped recording medium is pressed by the pressing section of the presser spring formed of a resin material to be held in the case body.

Secondly, it is preferable that a plurality of the pressing sections is installed in a direction parallel to the disk-shaped recording media and spaced apart from each other, and the plurality of pressing sections may be configured to be able to come in contact with the disk-shaped recording media, respectively.

As the plurality of pressing sections are configured to be spaced apart from each other in a direction parallel to the disk-shaped recording media to come in contact with the disk-shaped recording media, appropriate pressing forces are applied to the disk-shaped recording media by the pressing sections.

Thirdly, it is preferable that pressing forces of at least two pressing sections of the plurality of pressing sections applied to the disk-shaped recording media are configured to be different.

As different pressing forces are applied to the disk-shaped recording media from at least two pressing sections of the plurality of pressing sections, a sum of the holding force by the case body and the pressing force by the pressing section is substantially equal in each of the disk-shaped recording media.

Fourthly, it is preferable that the pressing section is configured to come in contact with a portion of the disk-shaped recording medium other than a cover layer configured to cover the recording surface.

As the pressing section comes in contact with a portion of the disk-shaped recording medium other than a cover layer configured to cover a recording surface, distortion may not be easily generated on the recording surface of the disk-shaped recording medium.

Fifthly, it is preferable that the pressing section is configured to come in line contact with the disk-shaped recording medium.

As the pressing section comes in linear contact with the disk-shaped recording medium, the disk-shaped recording medium is pressed by the pressing section in a stable state.

According to an embodiment of the present technology, the disk cartridge includes a case body in which a plurality of disk-shaped recording media are configured to be able to be received in an axial direction of a central shaft in parallel, and a first shell having a base surface section parallel to a recording surface of the disk-shaped recording medium and a second shell having a basal surface section parallel to the recording surface of the disk-shaped recording medium are coupled and separated through separation and connection in the axial direction, and a presser spring having a section to be attached, which is attached to the case body, and a pressing section configured to come in contact with an outer circumferential surface of the disk-shaped recording medium and to press the disk-shaped recording medium. The presser spring is formed of a resin material.

Accordingly, good formability of the presser spring can be secured to form the presser spring having a desired shape and size, the scratches or damage of the disk-shaped recording medium can be prevented, and the stable holding state of the disk-shaped recording medium by the presser spring can be secured.

According to an embodiment of the present technology, a plurality of the pressing sections may be installed in a direction parallel to the disk-shaped recording media and spaced apart from each other, and the plurality of pressing sections may be configured to be able to come in contact with the disk-shaped recording media, respectively.

Accordingly, the appropriate pressing forces can be applied to the disk-shaped recording media, and the stable receiving state of the disk-shaped recording medium in the case body can be maintained.

According to an embodiment of the present technology, pressing forces of at least two pressing sections of the plurality of pressing sections applied to the disk-shaped recording media may be configured to be different.

Accordingly, a sum of the holding force by the case body and the pressing force by the pressing section is substantially uniform in the disk-shaped recording medium, and the stable receiving state of each of the disk-shaped recording media in the case body can be secured.

According to an embodiment of the present technology, the pressing section may be configured to come in contact with a portion of the disk-shaped recording medium other than a cover layer configured to cover the recording surface.

Accordingly, the distortion may not be easily generated on the recording surface of the disk-shaped recording medium, and good recording and reproducing operations of the disk-shaped recording medium can be secured.

According to an embodiment of the present technology, the pressing section may be configured to come in line contact with the disk-shaped recording medium.

Accordingly, the stable pressing state of the disk-shaped recording medium by the presser spring can be secured and generation of the distortion on the recording surface of the disk-shaped recording medium can be suppressed.

BRIEF DESCRIPTION OF THE DRAWINGS

FIG. 25 is a bottom view showing the disk cartridge and the holding mechanism;

DETAILED DESCRIPTION OF THE EMBODIMENT(S)

Figure 1:
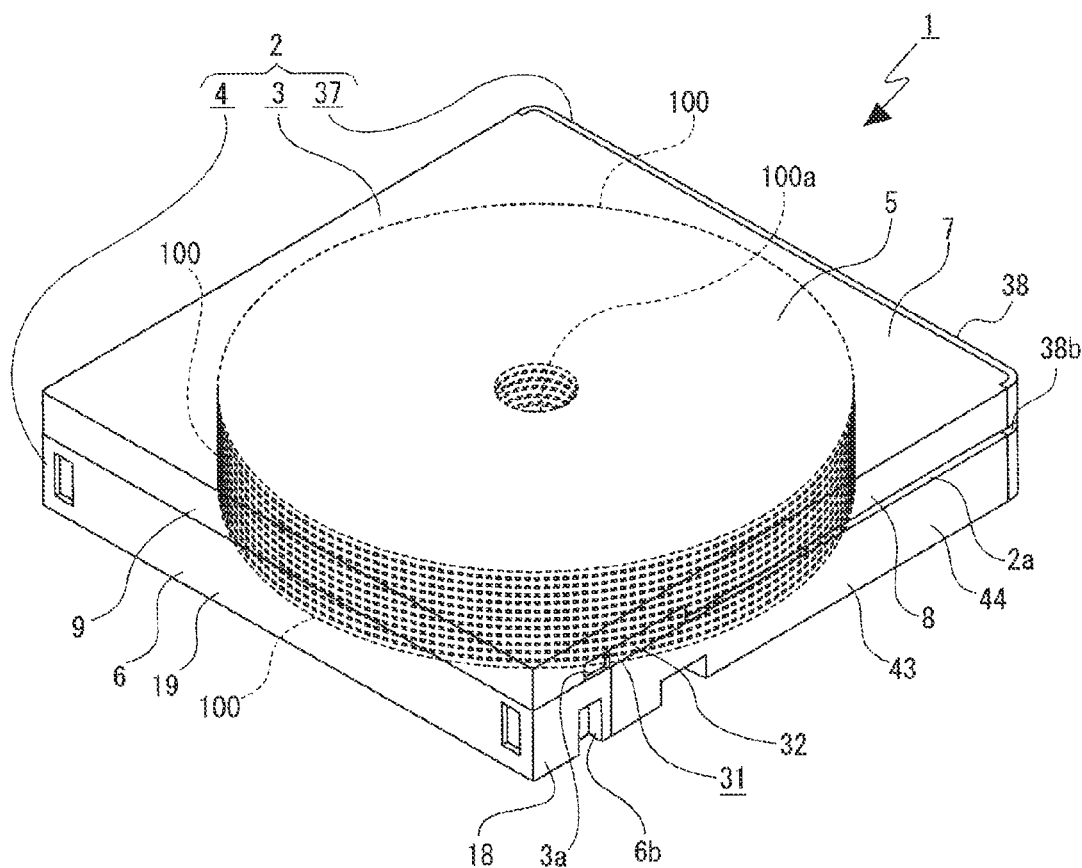
FIG. 1 is a perspective view of an embodiment of a disk cartridge according to an embodiment of the present technology, showing the disk cartridge with FIGS. 2 to 31.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In the following description, forward and rearward, upward and downward, and leftward and rightward directions are represented using a direction of inserting the disk cartridge from a cartridge insertion/extraction port of a disk changer as the forward direction. In addition, hereinafter, the forward and rearward directions are described as a first direction and the leftward and rightward directions are described as a second direction according to necessity.

Further, the forward and rearward, upward and downward, and rightward and leftward directions to be described below are provided for the convenience of description, and implementation of the present technology is not limited to these directions.

[Entire Configuration]

A disk cartridge 1 has necessary parts disposed in a case body 2, and the case body 2 has a first shell 3 and a second shell 4. A plurality of disk-shaped recording media 100 and 100 . . . can be configured to be received in the case body 2 in the upward and downward directions at equal intervals.

Figure 2:
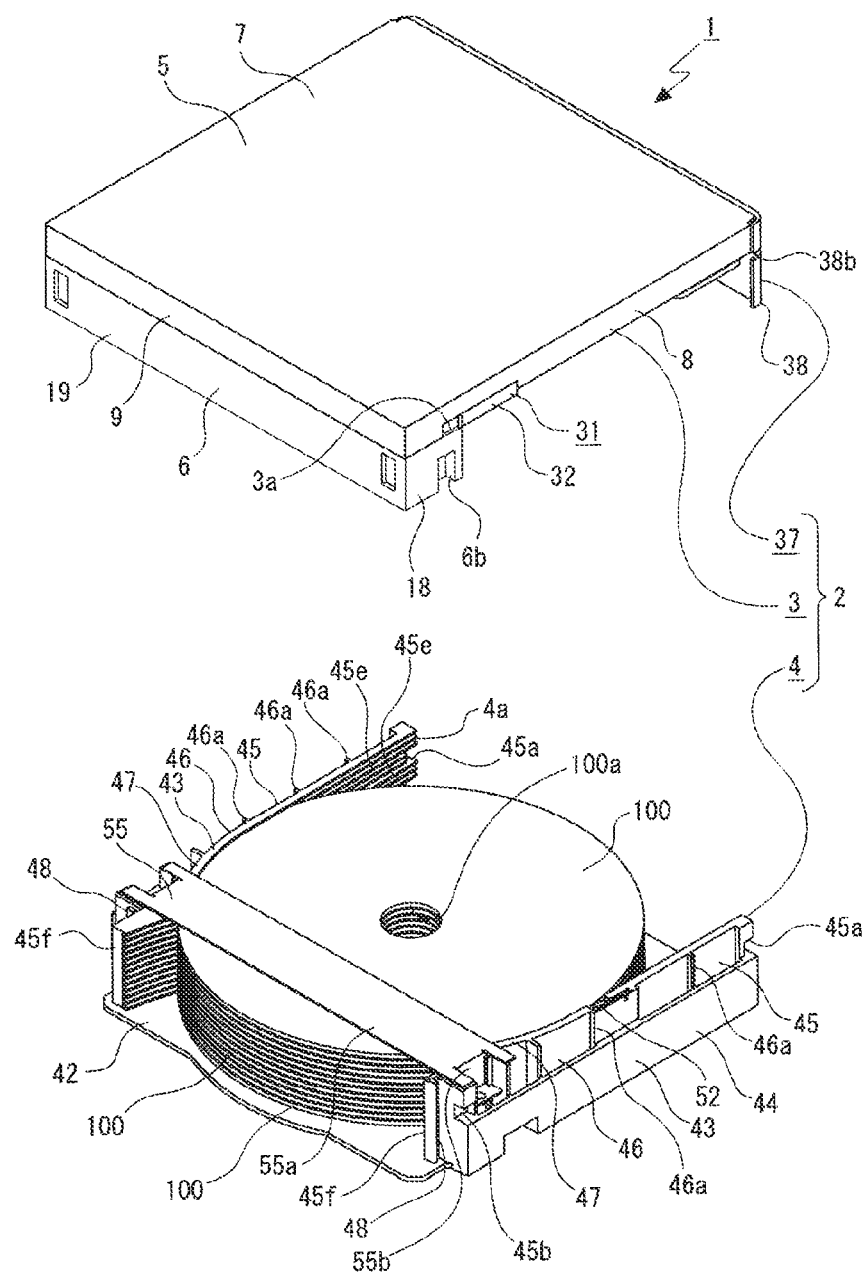
FIG. 2 is a perspective view of the disk cartridge showing a state in which a first shell and a second shell are separated.
Figure 3:
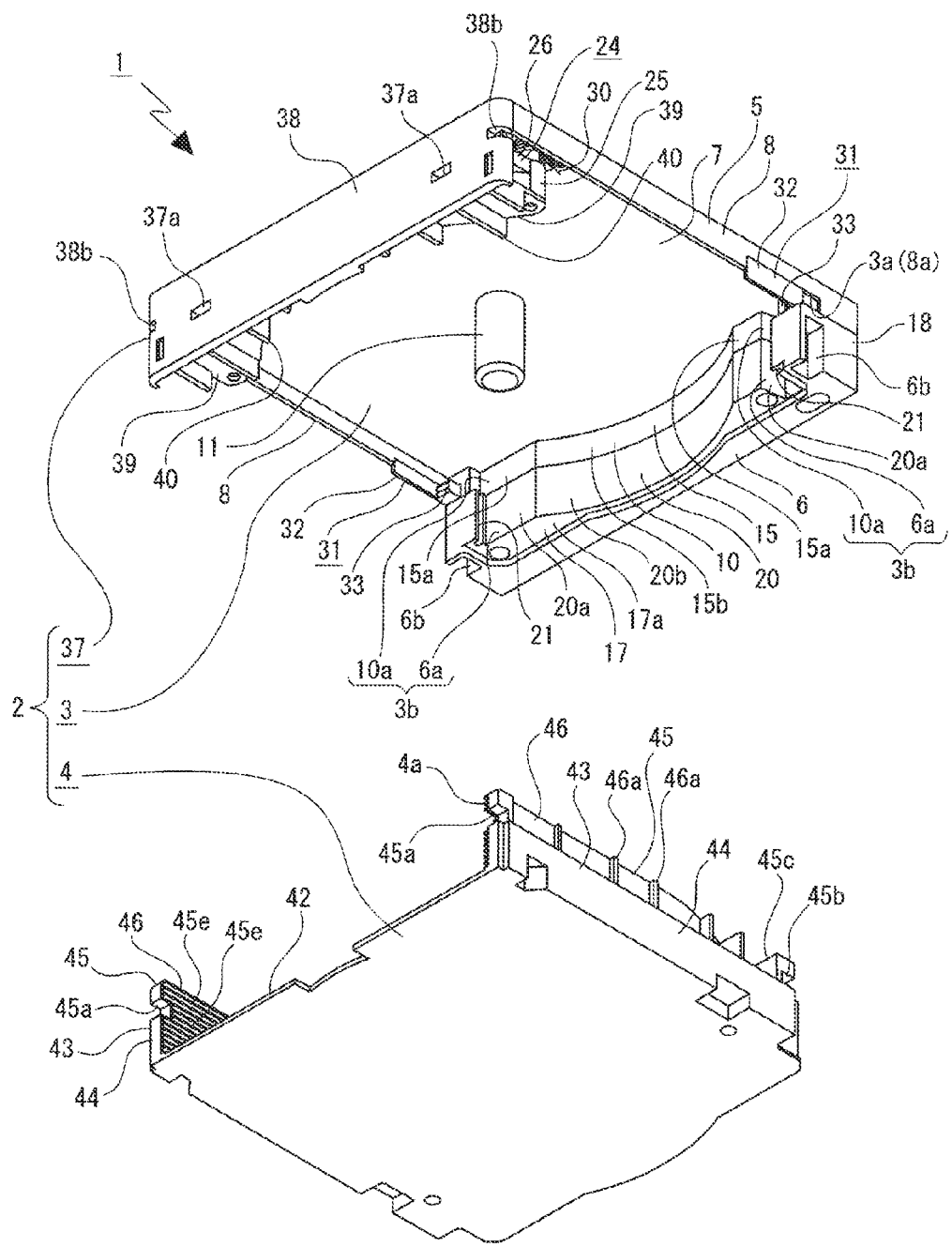
FIG. 3 is a perspective view of the disk cartridge showing a state in which the first shell and the second shell are separated when seen in a direction different from FIG. 2.

The first shell 3 and the second shell 4 can be coupled or separated, for example, in the upward and downward directions (see FIGS. 1 to 3). In addition, when the case body 2 is configured to have an elongated shape, the first shell 3 and the second shell 4 are coupled or separated in the leftward and rightward directions.

The first shell 3 is formed of a resin material, and has a base body 5 and an auxiliary base 6 attached to a rear end section of the base body 5, which are coupled in the upward and downward directions.

Figure 4:
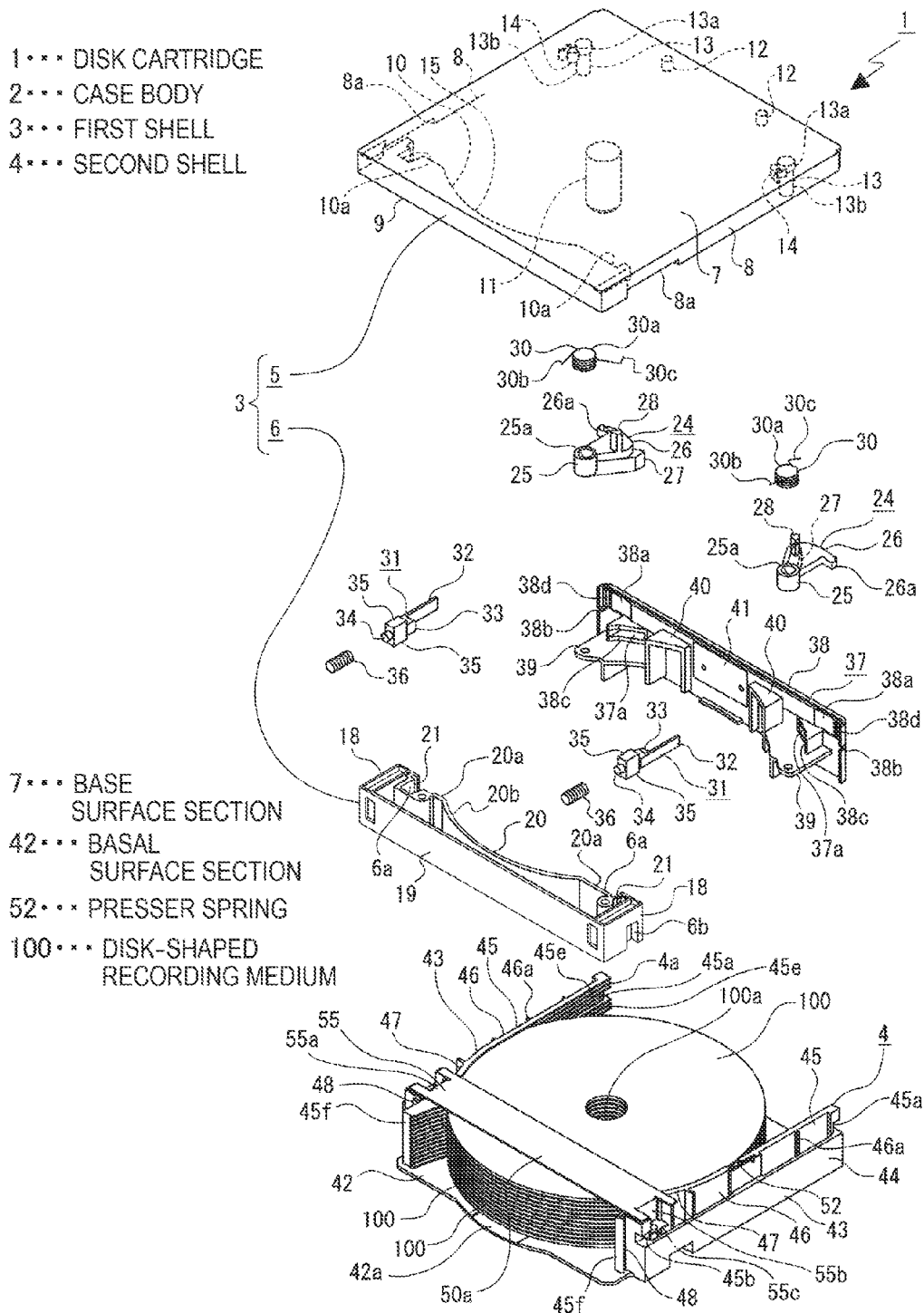
FIG. 4 is an exploded perspective view of the disk cartridge.
Figure 5:
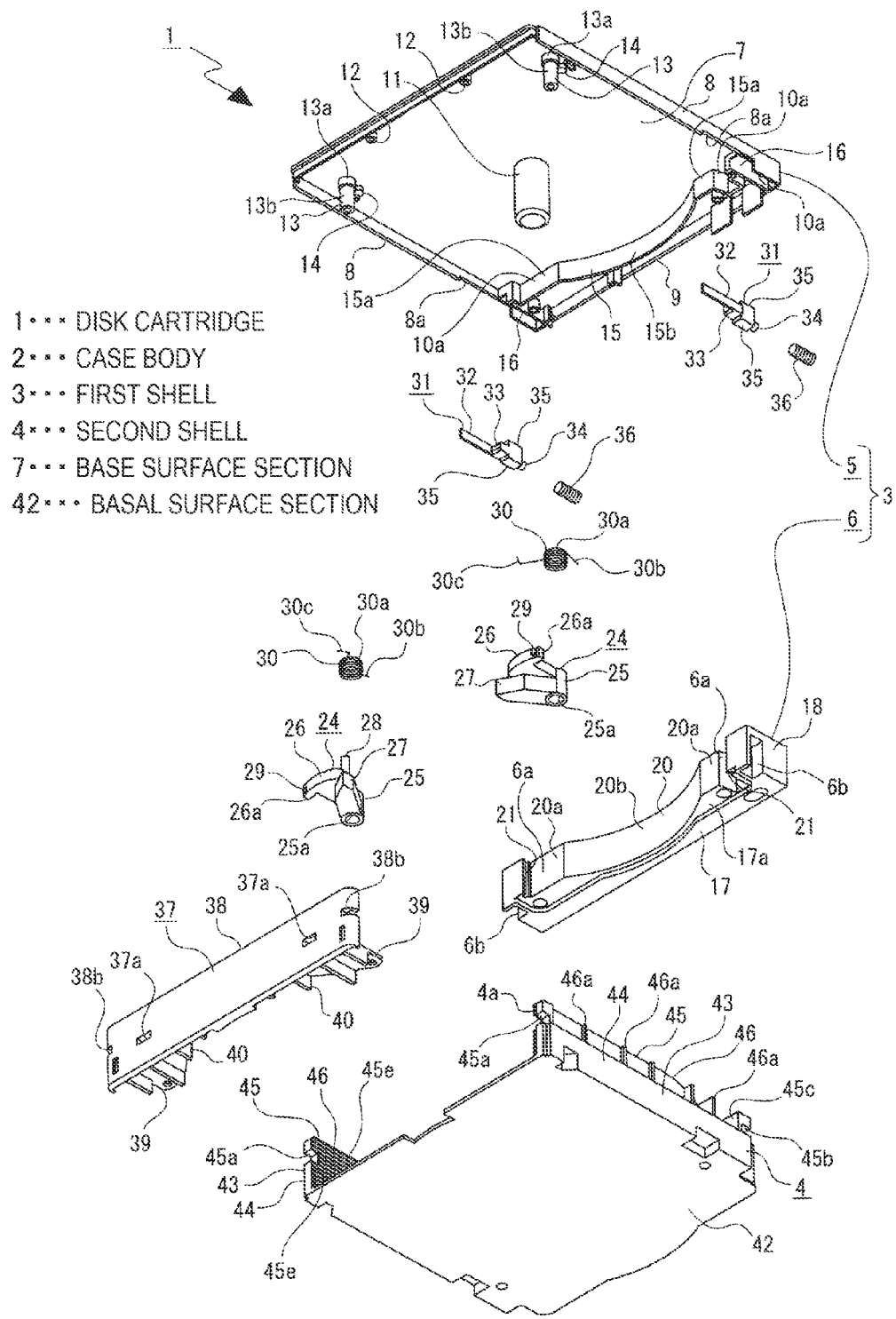
FIG. 5 is an exploded perspective view of the disk cartridge when seen in a direction different from FIG. 4.

As shown in FIGS. 4 and 5, the base body 5 has a base surface section 7 directed in the upward and downward directions, side surface sections 8 and 8 protruding downward from both of left and right end sections of the base surface section 7, a rear surface section 9 protruding downward from a rear end section of the base surface section 7, and a reinforcement section 10 formed at the rear end section of the base surface section 7 near a lower surface thereof.

A center pin 11 extending downward and having a cylindrical shaft shape is formed at a central section of the base surface section 7. Pressing bosses 12 and 12 protruding downward and spaced apart from each other leftward and rightward are formed at a front end section of the base surface section 7.

Support shafts 13 and 13 protruding downward and spaced apart from each other leftward and rightward are formed at positions around a front end of the base surface section 7, upper end sections of the support shafts 13 and 13 are formed as spring support sections 13a and 13a, and a portion other than the upper end section is formed as lever support sections 13b and 13b having a smaller diameter than the spring support sections 13a and 13a. The support shaft 13 has a circular cross-section perpendicular to an axial direction.

Spring-hooking protrusions 14 and 14 are formed at positions near the support shafts 13 and 13 of the lower surface of the base surface section 7.

Support concave sections 8a and 8a opened downward are formed at positions around the rear ends of the side surface sections 8 and 8.

The reinforcement section 10 is constituted by an outer wall 15 disposed at a front side and directed in substantially the forward direction, and sidewalls 16 and 16 protruding downward from both of left and right end sections of the outer wall 15, and opened downward. The rear end sections of the sidewalls 16 and 16 are connected to portions around both of left and right ends of the rear surface section 9.

In the outer wall 15, both of left and right end sections are formed as flat surface sections 15a and 15a directed forward except for portions, and a portion between the flat surface sections 15a and 15a is formed as a restriction section 15b formed in an arc shape, which is moderately concaved forward. A radius of curvature of the restriction section 15b is substantially the same radius of curvature of an outer circumferential surface of a disk-shaped recording medium 100.

In the reinforcement section 10, concave sections 10a and 10a opened forward or forward and laterally are formed at the flat surface sections 15a and 15a.

The auxiliary base 6 has an oblong bottom surface plate 17, side surface plates 18 and 18 protruding upward from both of left and right end sections of the bottom surface plate 17, a rear surface plate 19 protruding upward from a rear end section of the bottom surface plate 17, and a front surface plate 20 protruding upward from a front end section of the bottom surface plate 17, and is opened upward. Like the reinforcement section 10, the auxiliary base 6 functions as a reinforcement section configured to reinforce the first shell 3 and increase strength of the first shell 3.

A shallow concave shaped section 17a is formed at the rear end section of the bottom surface plate 17 near a lower surface thereof.

In the front surface plate 20, both of left and right end sections are formed as flat surface sections 20a and 20a directed forward, except for portions, and a portion between the flat surface sections 20a and 20a is formed as a restriction section 20b formed in an arc shape, which is moderately concaved forward. The front surface plate 20 has substantially the same size and shape as the outer wall 15 of the reinforcement section 10 of the base body 5 of the first shell 3.

In the auxiliary base 6, concave sections 6a and 6a opened forward or forward and laterally are formed at the flat surface sections 20a and 20a. Grip sections 6b and 6b having a groove shape and opened laterally and downward are formed at lower end sections of both of left and right end sections of the auxiliary base 6.

Figure 6:
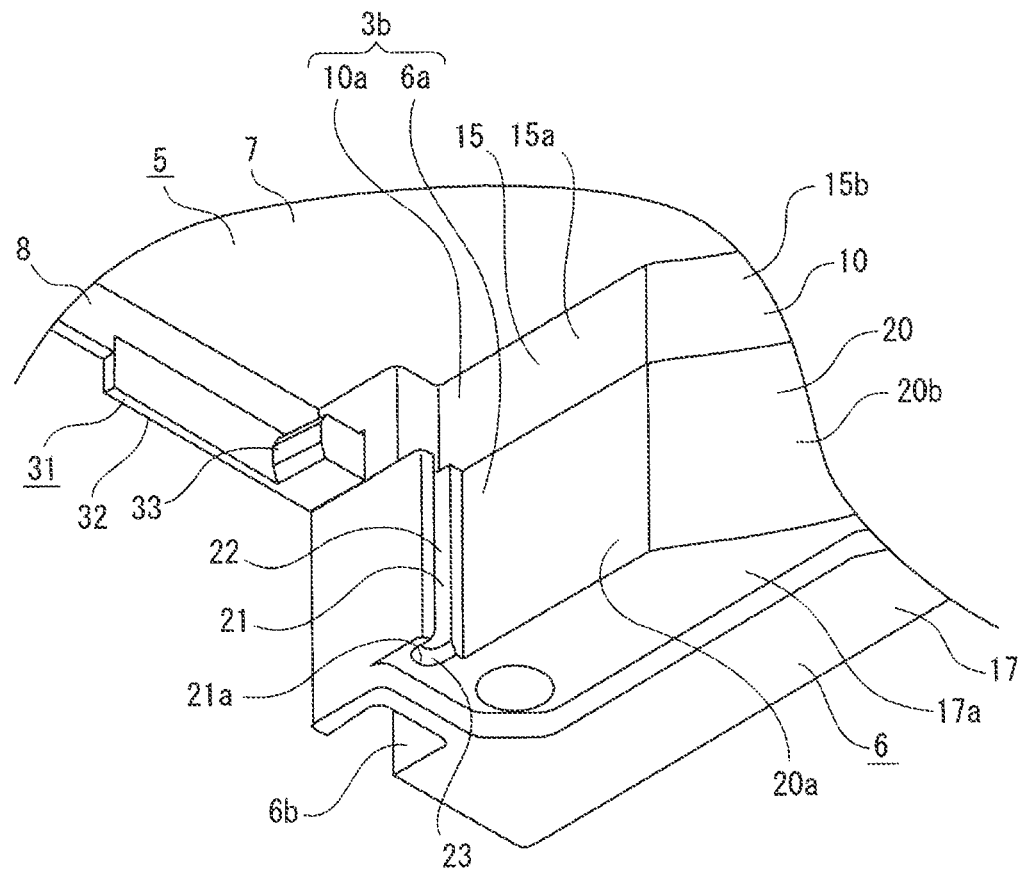
FIG. 6 is an enlarged perspective view showing a positioning concave section formed at the first shell.

Positioning concave sections 21 and 21 disposed in a direction approaching each other (laterally) and opened upward and downward are formed at positions around both of left and right ends of the auxiliary base 6, and the positioning concave sections 21 and 21 are formed in groove shapes extending upward and downward (see FIGS. 4 to 6). The positioning concave section 21 is opened at the concave section 6a, a portion other than a lower end section is formed as a uniform width section 22 having a uniform groove width, and the lower end section is formed as a width displacement section 23 having a larger groove width than the uniform width section 22.

The width displacement section 23 is formed such that a width is increased in the forward and rearward directions and the leftward and rightward directions toward a lower opening edge 21a of the positioning concave section 21.

The auxiliary base 6 is attached to the base body 5 by a fastening screw or the like. In a state in which the auxiliary base 6 is attached to the base body 5, the auxiliary base 6, the reinforcement section 10, the side surface sections 8 and 8 and the rear surface section 9 overlap to form a space therein. Here, the outer wall 15 of the base body 5 and the front surface plate 20 of the auxiliary base 6 overlap.

In addition, in a state in which the auxiliary base 6 is attached to the base body 5, the support concave sections 8a and 8a of the base body 5 are formed as slider support sections 3a and 3a (see FIGS. 2 and 3). Further, insertion concave sections 3b and 3b are formed at corresponding positions between the concave sections 10a and 10a of the base body 5 and the concave sections 6a and 6a of the auxiliary base 6.

Lock levers 24 and 24 are pivotally supported by the support shafts 13 and 13 of the first shell 3 (see FIGS. 3 to 5).

Figure 7:
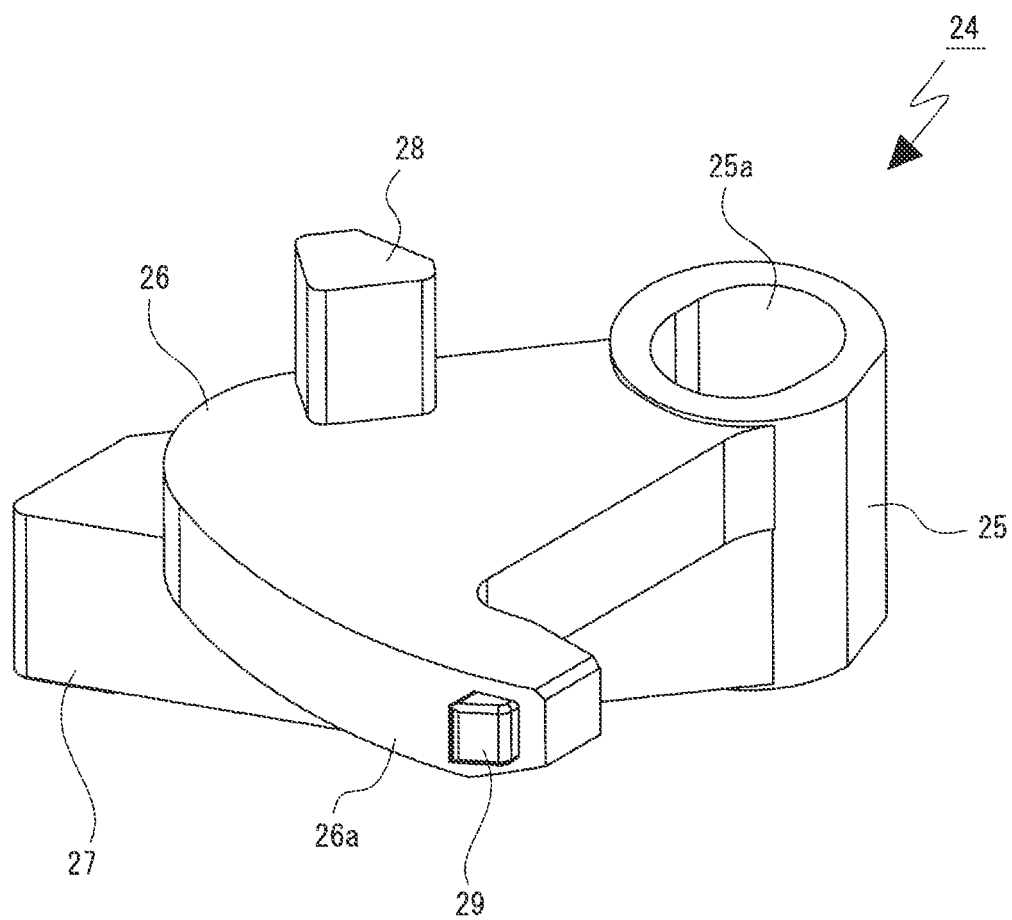
FIG. 7 is an enlarged perspective view of a lock lever.

As shown in FIG. 7, the lock lever 24 is constituted by a cylindrical section to be supported 25 into which the support shaft 13 is inserted and supported, a lock section 26 protruding from a substantially upper half section of the section to be supported 25, a lock release section 27 protruding from a substantially lower half section of the section to be supported 25, a spring support protrusion 28 protruding from the lock section 26, and an engaging protrusion 29 protruding from a front end section of the lock section 26.

The section to be supported 25 has a cross-sectional shape perpendicular to the axial direction formed in an oval shape, and has a hole to be inserted 25a. The hole to be inserted 25a has a cross-sectional shape perpendicular to the axial direction and formed in an oval shape.

The lock section 26 protrudes substantially forward from the section to be supported 25. The lock section 26 has a locking protrusion 26a having an outer circumferential surface (a surface of a forward side) formed in an arc surface shape about a central shaft of the section to be supported 25 and protruding laterally at a tip section thereof. The locking protrusion 26a is formed in a tapered shape that is reduced toward a tip thereof.

The lock release section 27 protrudes to be inclined forward from the section to be supported 25.

The spring support protrusion 28 protrudes upward from the lock section 26 and is formed at a side at which the lock release section 27 is disposed.

The engaging protrusion 29 protrudes from the outer circumferential surface of the locking protrusion 26a.

Figure 8:
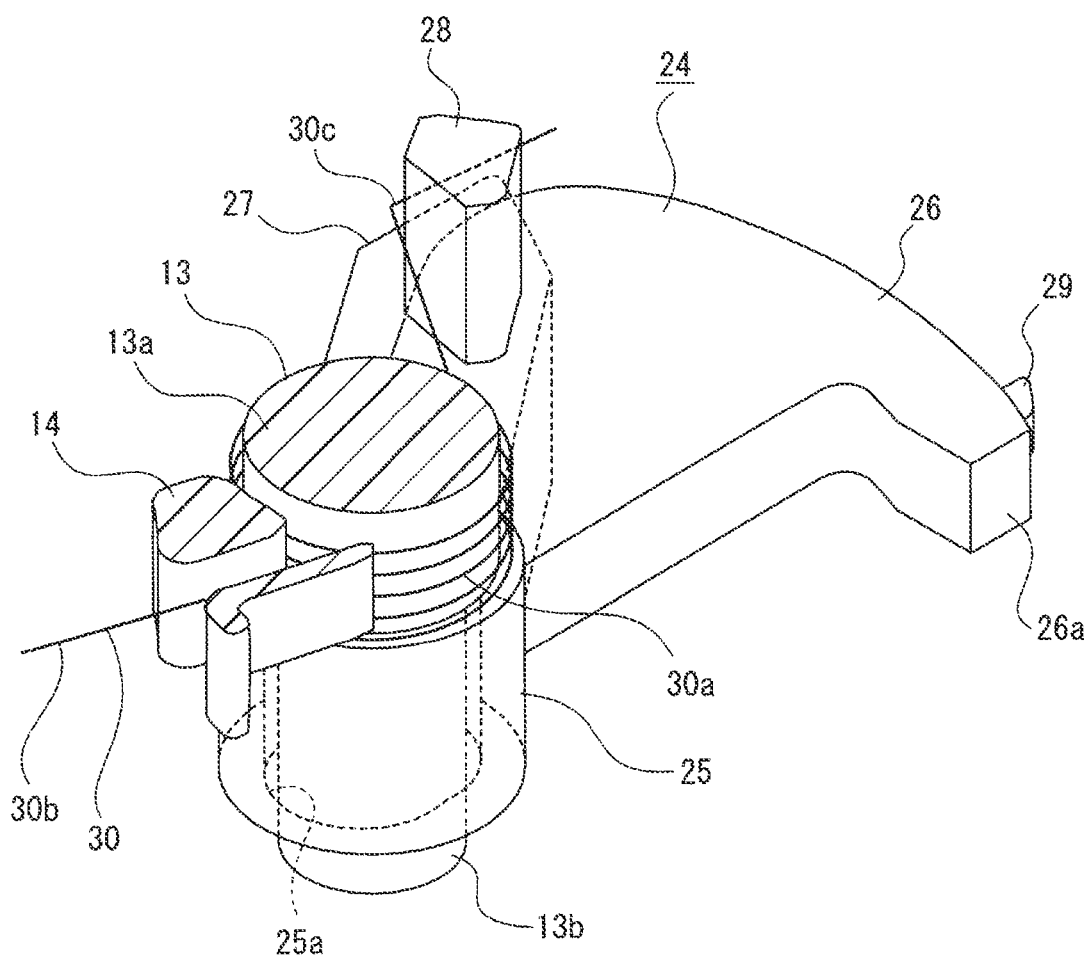
FIG. 8 is an enlarged perspective view showing the lock lever supported by a support shaft together with a biasing spring.

The lock levers 24 and 24 are configured to be pivotable about central shafts of the support shafts 13 and 13 having the lever support sections 13b and 13b of the support shafts 13 and 13 inserted into the sections to be supported 25 and 25 (see FIG. 8). In a state in which the lock levers 24 and 24 are supported by the support shafts 13 and 13, the lock levers 24 and 24 are biased in a direction in which the locking protrusions 26a and 26a of the lock sections 26 and 26 approach the side surface sections 8 and 8 by biasing springs 30 and 30.

For example, the biasing spring 30 is a torsional coil spring, and is constituted by a coil section 30a and a pair of arm sections 30b and 30c protruding from the coil section 30a. In the biasing spring 30, the coil section 30a is supported by a spring support section 13a of the support shaft 13, the one arm section 30b is engaged with the spring-hooking protrusion 14 installed at the base surface section 7 of the first shell 3, and the other arm section 30c is engaged with the spring support protrusion 28 of the lock lever 24.

Lock sliders 31 and 31 are slidably supported at the slider support sections 3a and 3a of the first shell 3 in the forward and rearward directions (see FIGS. 3 to 5).

Figure 9:
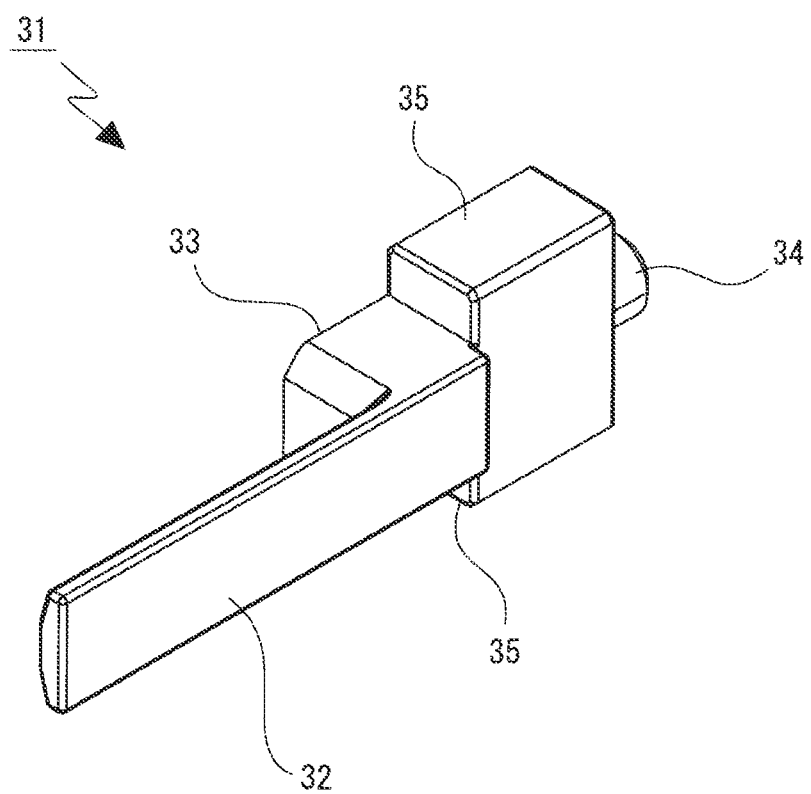
FIG. 9 is an enlarged perspective view of a lock slider.

As shown in FIG. 9, the lock slider 31 is constituted by a section to be supported 32 extending forward and rearward, a lock section 33 protruding inward from a rear end section of the section to be supported 32, a spring support shaft section 34 protruding rearward from a rear surface of the lock section 33, and protrusion shaped sections 35 and 35 protruding upward and downward from a rear half section of the lock section 33.

In the lock sliders 31 and 31, the sections to be supported 32 and 32 and the lock sections 33 and 33 are slidably supported by the slider support sections 3a and 3a of the first shell 3, and coil springs 36 and 36 are supported by the spring support shaft sections 34 and 34. The ends of the coil spring 36 come in contact with a rear surface of the lock section 33 and a rear surface that forms the slider support section 3a. Accordingly, the lock slider 31 is biased forward by the coil spring 36.

An opening/closing panel 37 is attached to a front end section of the first shell 3 by a fastening screw (see FIGS. 1 to 3). As shown in FIGS. 4 and 5, the opening/closing panel 37 is formed of a resin material, and has a panel section 38 formed in an oblong rectangular plate shape directed in the forward and rearward directions, protrusions to be attached 39 and 39 protruding rearward from a lower end section of a rear surface of the panel section 38, and push sections 40 and 40 formed at the rear surface of the panel section 38.

Insertion concave sections 38a and 38a opened rearward are formed at the rear surface of the panel section 38 to be spaced apart from each other leftward and rightward. The insertion concave sections 38a and 38a are formed as arc-shaped concave sections. Insertion notches 38b and 38b opened outward are formed at both of left and right end sections of the panel section 38. Protrusions to be inserted 38c and 38c protruding rearward are formed at the panel section 38. The protrusions to be inserted 38c are formed in a triangular shape when seen in the upward and downward directions, and formed on an inclined surface displaced forward as a tip surface moves from an outside to an inside thereof.

Engaging grooves 38d and 38d opened forward are formed in the panel section 38 outside the insertion concave sections 38a and 38a.

The protrusions to be attached 39 and 39 are formed to be spaced apart from each other leftward and rightward, and the push sections 40 and 40 are formed inside the protrusions to be attached 39 and 39 to be spaced apart from each other leftward and rightward. The protrusions to be attached 39 and 39 are formed under the protrusions to be inserted 38c and 38c.

Insertion holes 37a and 37a are formed in the opening/closing panel 37 to be spaced apart from each other leftward and rightward. The insertion holes 37a and 37a are formed inside the protrusions to be inserted 38c and 38c.

A magnetic plate 41 is attached to a central section in the leftward and rightward directions of a rear surface (an inner surface) of the panel section 38. In addition, the magnetic plate 41 may have magnetic properties, and for example, may be a magnet.

The opening/closing panel 37 is attached to the first shell 3 by screw-fastening tip sections of the protrusions to be attached 39 and 39 to lower surfaces of the support shafts 13 and 13 formed at the base surface section 7, and pushing the push sections 40 and 40 against the lower surfaces of the pressing bosses 12 and 12 of the base surface section 7.

In a state in which the opening/closing panel 37 is attached to the first shell 3, the protrusions to be attached 39 and 39 are screw-fastened to lower sides of the support shafts 13 and 13, and prevented from being separated from the support shafts 13 and 13 of the lock levers 24 and 24 and the biasing springs 30 and 30 supported by the support shafts 13 and 13. In a state in which the protrusions to be attached 39 and 39 are attached to the support shafts 13 and 13, upper surfaces of the protrusions to be attached 39 and 39 are disposed near the lower surfaces of the lock sections 26 and 26 of the lock levers 24 and 24.

In a state in which the opening/closing panel 37 is attached to the first shell 3, the lock release sections 27 and 27 of the lock levers 24 and 24 are disposed right behind the insertion holes 37a and 37a.

Figure 10:
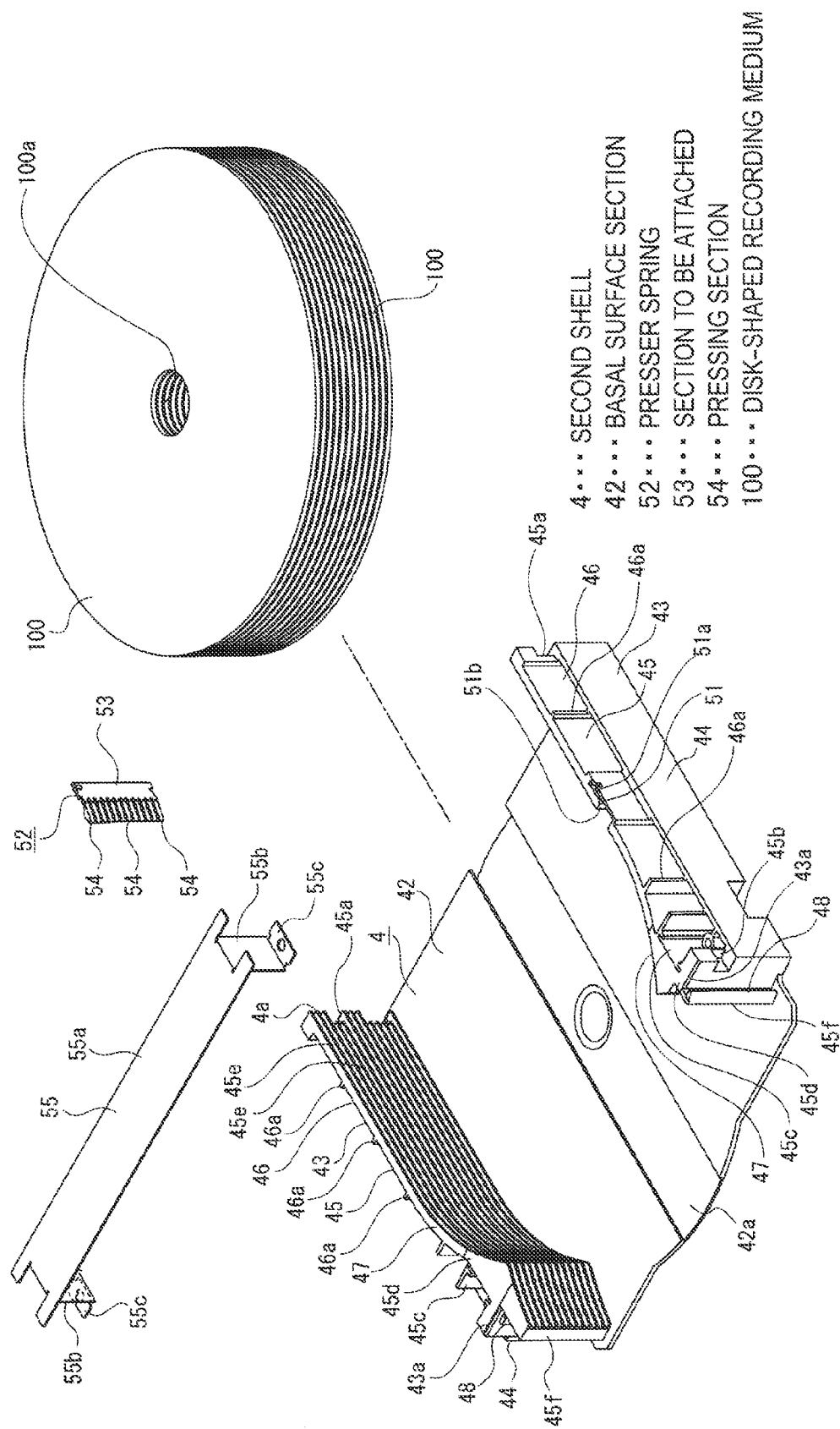
FIG. 10 is an exploded perspective view showing the second shell, a bridge member, a presser spring and a disk-shaped recording medium.

The second shell 4 is formed of a resin material, and constituted by integrally forming a basal surface section 42 directed in the upward and downward directions, and side surface sections 43 and 43 protruding upward from both of left and right end sections of the basal surface section 42 (see FIGS. 3, 5 and 10).

A central section in the leftward and rightward directions of the basal surface section 42 is formed as a thin section 42a having a slightly smaller thickness than the other portion. The thin section 42a is formed as an upwardly concaved step surface.

The side surface section 43 is constituted by an outer sidewall section 44 and an inner sidewall section 45 disposed inside the outer sidewall section 44, and a plurality of constant gaps are formed between the outer sidewall section 44 and the inner sidewall section 45 and spaced apart from each other forward and rearward.

The outer sidewall section 44 has a height, which is substantially half a height of the inner sidewall section 45, and an upper surface lower than an upper surface of the inner sidewall section 45.

The inner sidewall section 45 has a linear section 46 extending forward and rearward, and an arc-shaped section 47 connected to a position around a rear end of the linear section 46 and having an arc shape displaced inward as it moves rearward.

A first locking concave section 45a opened forward and passing leftward and rightward is formed in a front end section of the inner sidewall section 45. A second locking concave section 45b opened rearward and outward is formed at a position around a rear end of the linear section 46 of the inner sidewall section 45.

An attachment hole 45c opened upward is formed at a position around a rear end of the inner sidewall section 45. A step surface 45d formed at a portion around the attachment hole 45c and having a height slightly smaller than that of the other portion is formed at an upper surface of the inner sidewall section 45.

Ribs 46a, 46a . . . spaced apart from each other forward and rearward and extending upward and downward are formed at an outer surface of the linear section 46 of the inner sidewall section 45, and outer surfaces of the ribs 46a, 46a . . . are connected to an inner surface of the outer sidewall section 44.

Holding grooves 45e, 45e . . . are formed in the inner surface of the inner sidewall section 45, and the holding grooves 45e, 45e . . . are disposed at positions in the upward and downward directions at equal intervals. A rear end section of the inner sidewall section 45 is formed as an insertion protrusion 45f protruding rearward.

Figure 11:
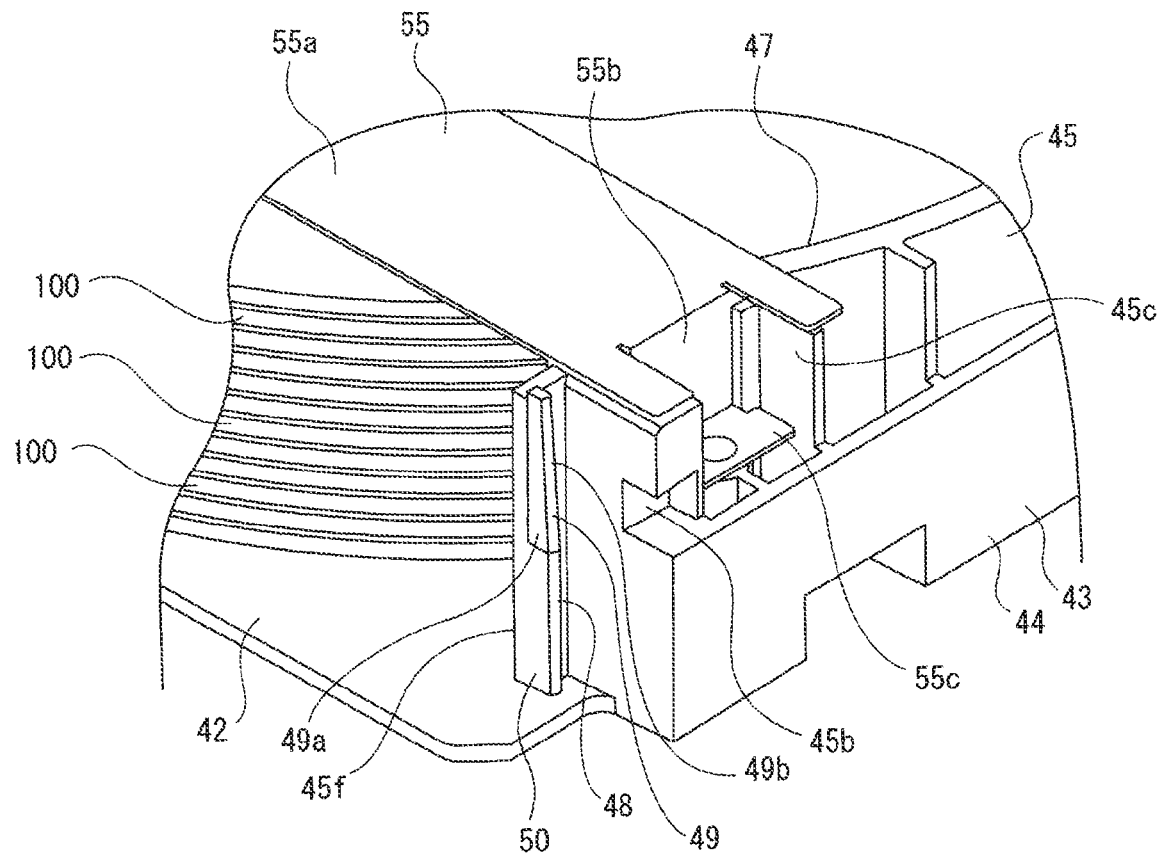
FIG. 11 is an enlarged perspective view showing one positioning protrusion formed at the second shell.
Figure 12:
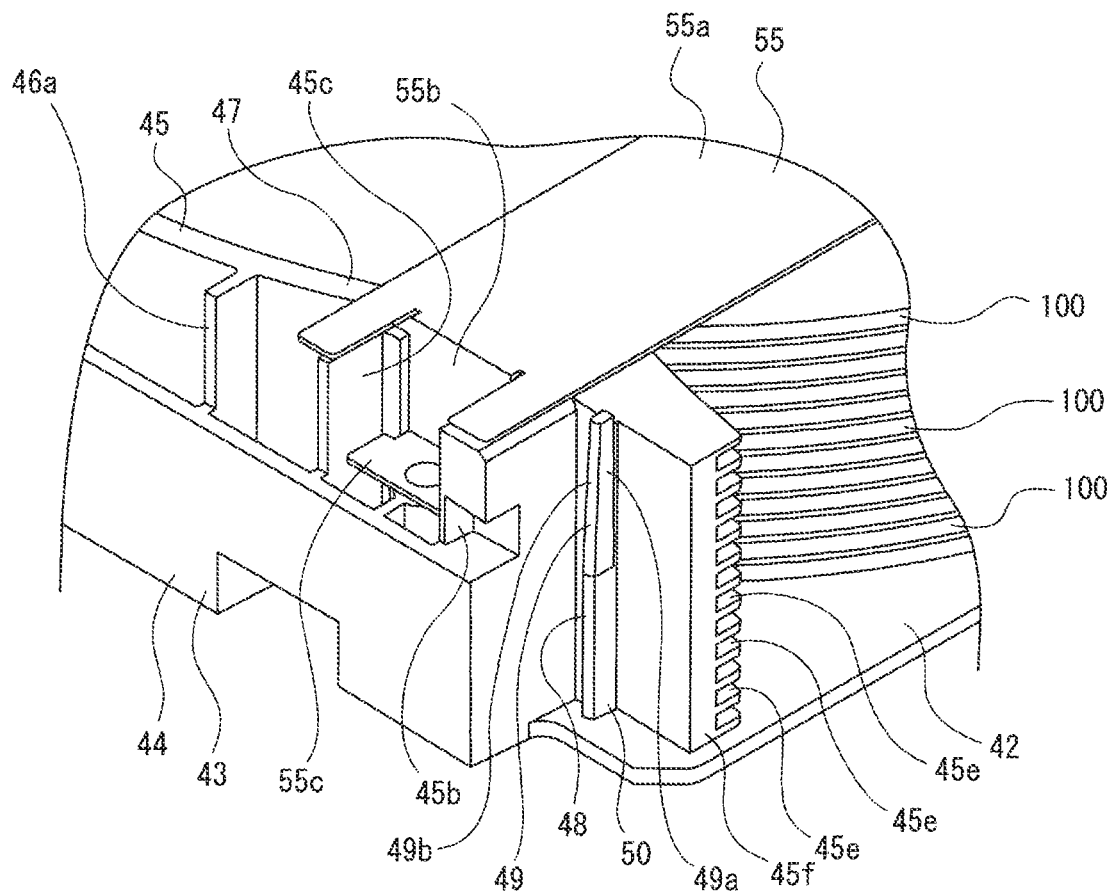
FIG. 12 is an enlarged perspective view showing the other positioning protrusion formed at the second shell.

Positioning protrusions 48 and 48 protruding outward (laterally) are formed at positions around rear end sections or rear ends of the insertion protrusions 45f and 45f (see FIGS. 11 and 12).

Figure 13:
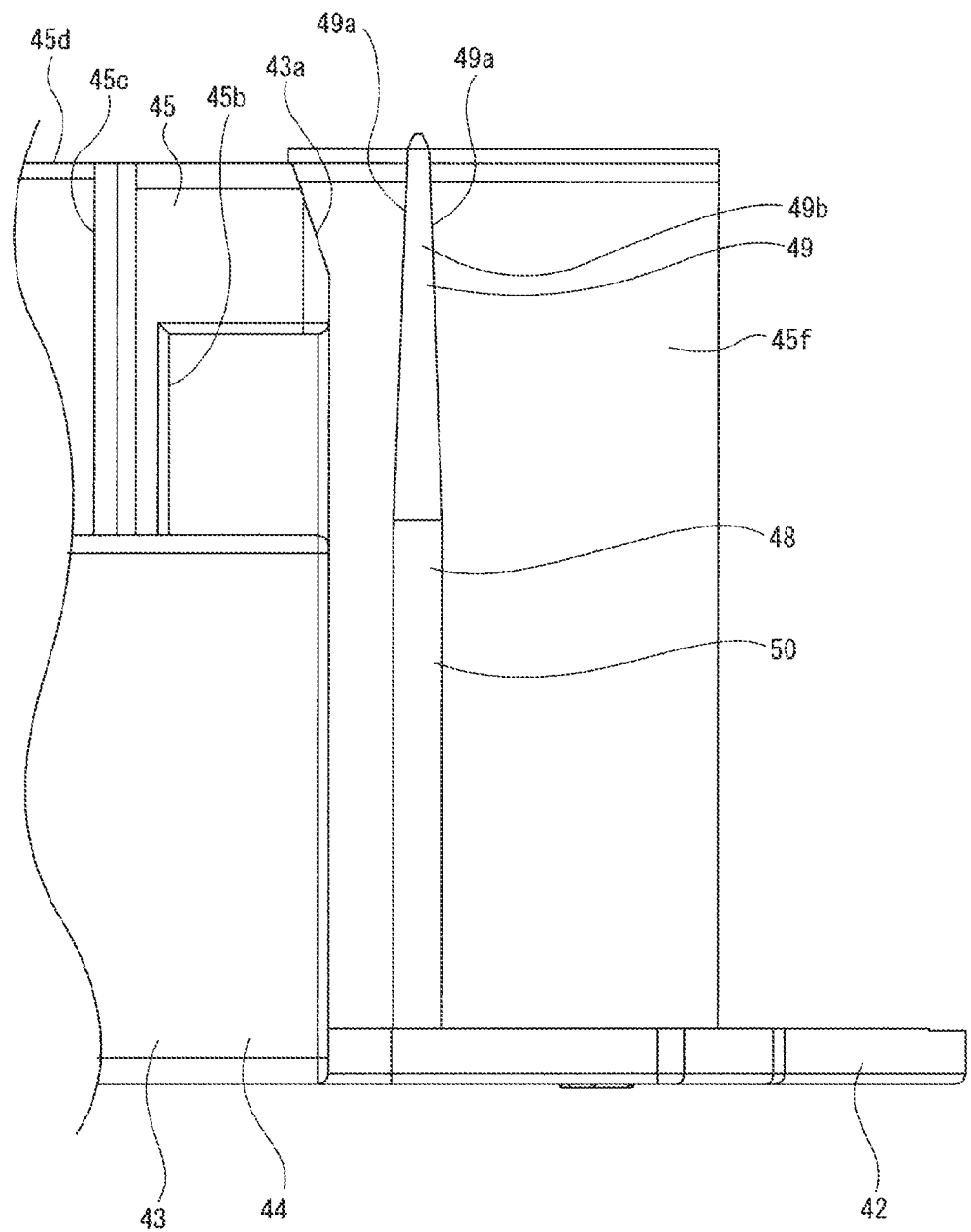
FIG. 13 is an enlarged side surface of the positioning protrusion.
Figure 14:
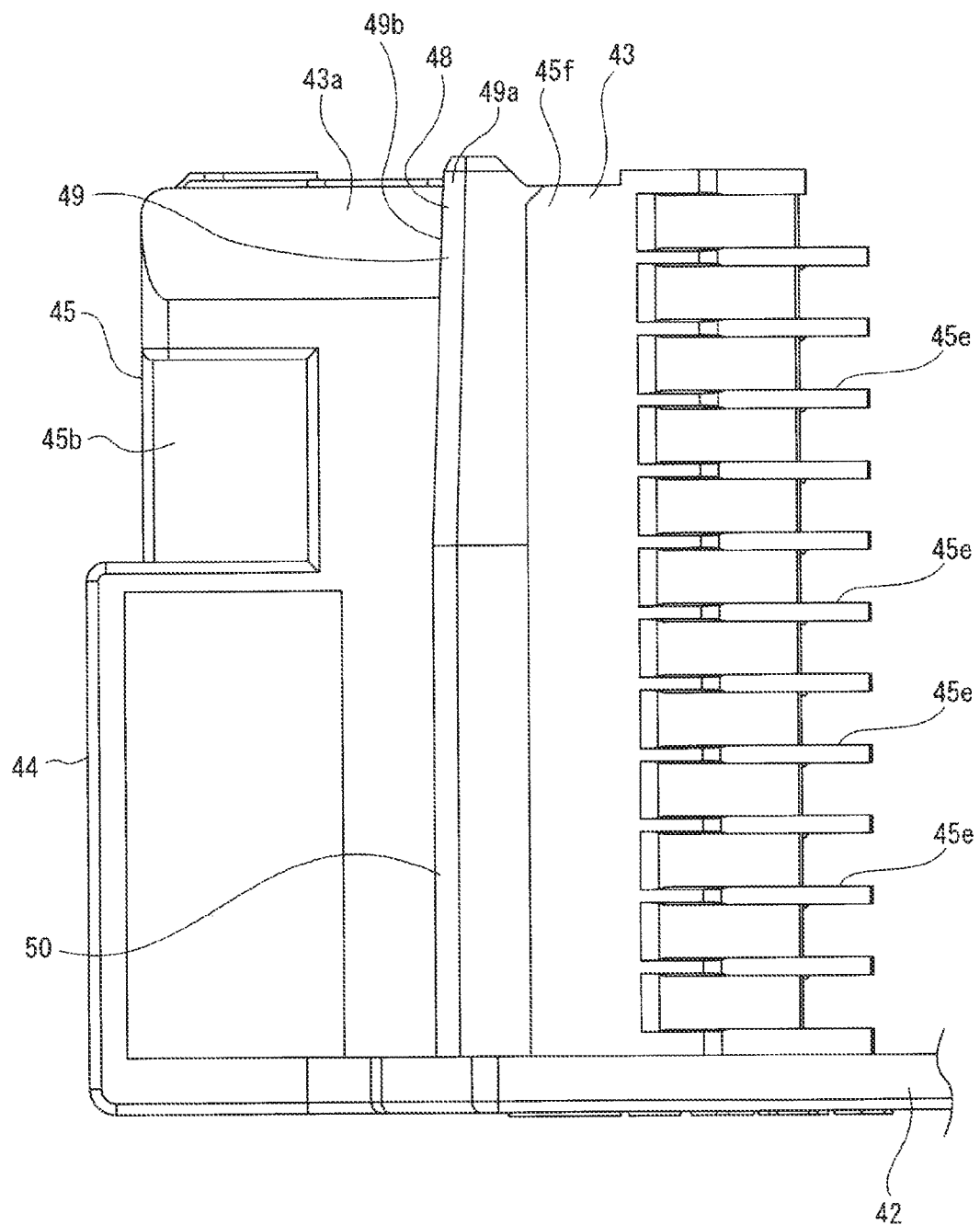
FIG. 14 is an enlarged rear view of the positioning protrusion.

The positioning protrusions 48 are formed as first inclined surfaces 49a and 49a to be directionally displaced to approach each other as both of front and rear surfaces of an upper half section 49 extending in the upward and downward directions move upward (see FIG. 13). Accordingly, the upper half section 49 is formed such that a thickness (a width in the first direction) is reduced as it moves upward. A thickness of a lower half section 50 of the positioning protrusion 48 is the same as that of a lower end of the upper half section 49 and becomes constant.

In addition, the positioning protrusion 48 is formed as a second inclined surface 49b gently displaced inward as the outer surface of the upper half section 49 goes upward (see FIG. 13). Accordingly, the upper half section 49 is formed such that a width (a width in the second direction) is reduced as it goes upward. A width of the lower half section 50 of the positioning protrusion 48 is the same as that of the lower end of the upper half section 49 and becomes constant.

Guide surfaces 43a and 43a inclined to be displaced forward as it goes upward is formed at positions opposite to the first inclined surfaces 49a and 49a of one of the side surface sections 43 and 43 of the second shell 4.

A spring attachment concave section 51 is formed at one of the inner sidewall sections 45. The spring attachment concave section 51 is constituted by an insertion attachment section 51a opened upward and a protrusion concave section 51b opened upward and formed at an inner surface of the linear section 46, and the protrusion concave section 51b is in communication with a rear end section of the insertion attachment section 51a.

Figure 15:
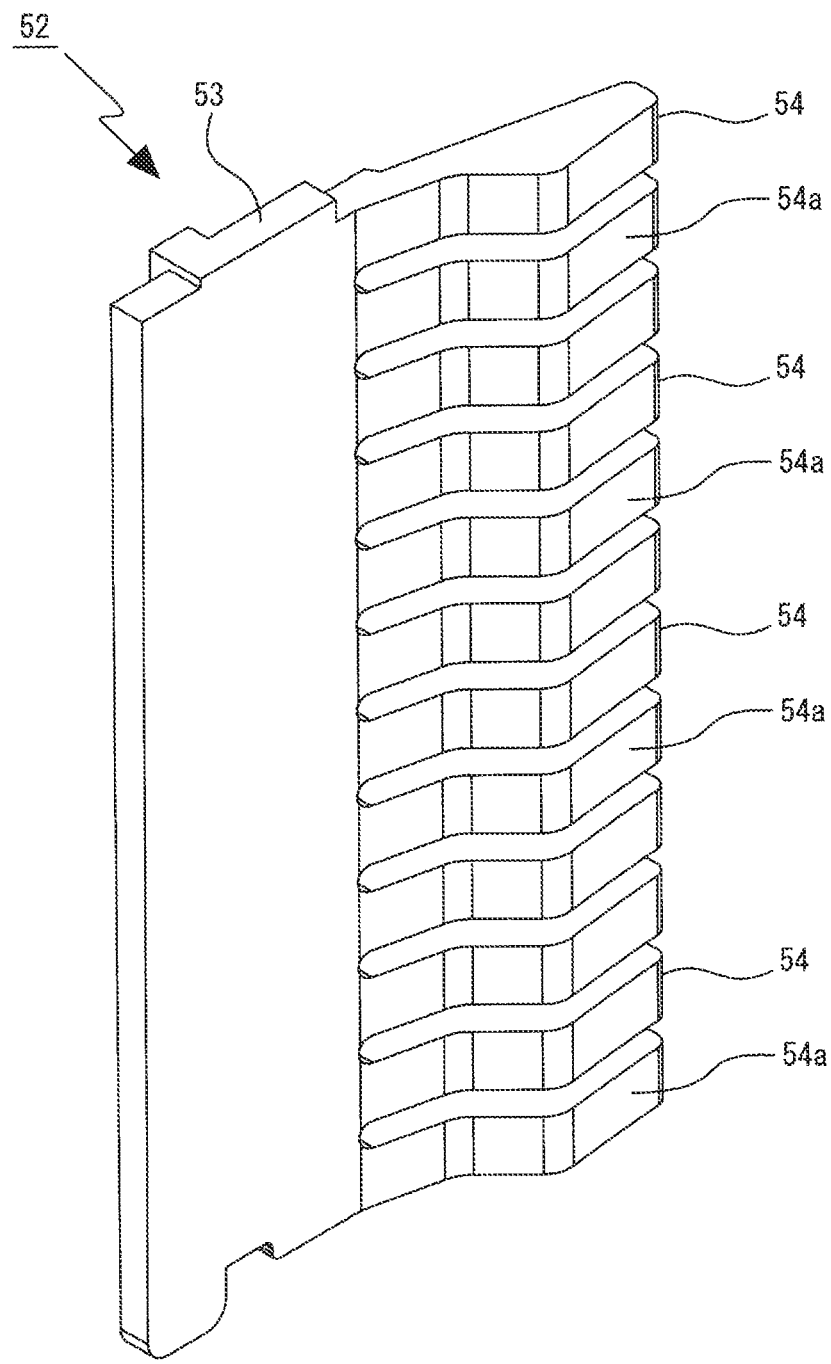
FIG. 15 is an enlarged perspective view of the presser spring.

A presser spring 52 is inserted and attached to the spring attachment concave section 51 (see FIGS. 2 and 4). As shown in FIG. 15, the presser spring 52 is constituted by integrally forming a section to be attached 53 having an elongated plate shape and pressing sections 54, 54 . . . protruding from a rear edge of the section to be attached 53 using a resin material. The pressing sections 54, 54 . . . are formed in the upward and downward directions at the same intervals as the upward and downward intervals of the holding grooves 45e, 45e . . . , and thus the same number of pressing sections 54, 54 . . . as the holding grooves 45e, 45e . . . are formed.

Figure 16:
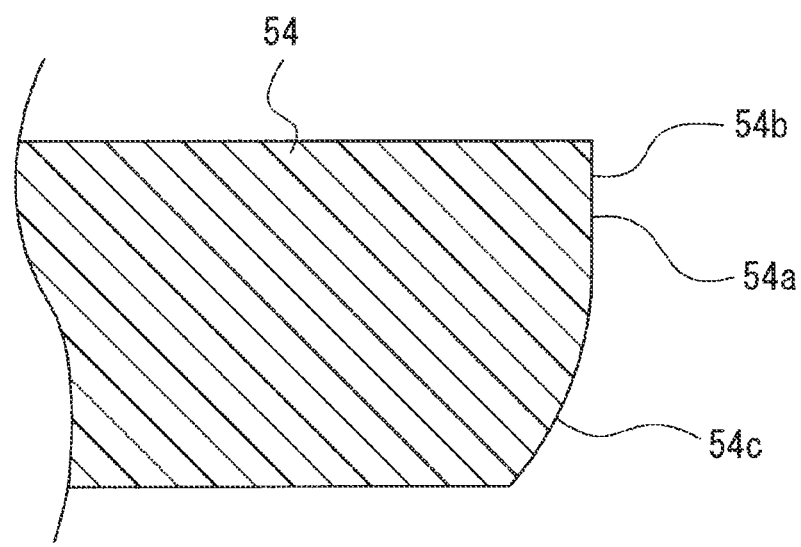
FIG. 16 is an enlarged cross-sectional view showing a pressing section of the presser spring.

A flat surface section 54a slightly inclined in the forward and rearward directions is formed at a tip section of the pressing section 54. In the presser spring 52, a portion of the flat surface section 54a is in line contact with an outer circumferential surface of the disk-shaped recording medium 100. As shown in FIG. 16, the pressing section 54 is formed as a contact section 54b, which is vertical, except for a lower end section of the flat surface section 54a, and the lower end section of the flat surface section 54a is formed as an inclined section 54c displaced toward the rear surface of the flat surface section 54a as it goes downward.

The presser spring 52 is attached to the spring attachment concave section 51 by inserting the section to be attached 53 into the insertion attachment section 51a and inserting the pressing sections 54, 54 . . . into the protrusion concave section 51b. In a state in which the presser spring 52 is attached to the spring attachment concave section 51, the flat surface sections 54a, 54a . . . of the pressing sections 54, 54 . . . protrude inward the linear section 46.

Figure 17:
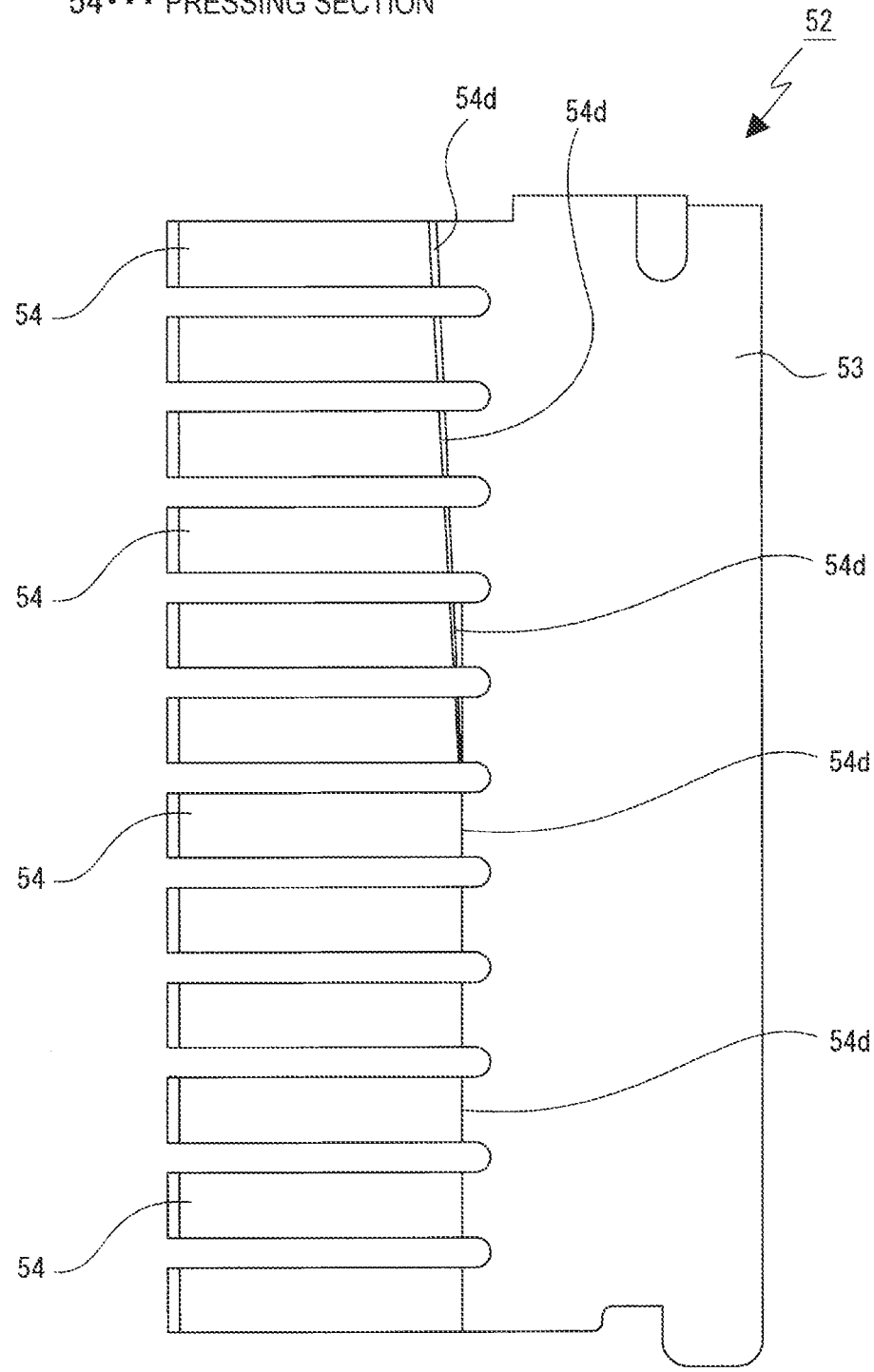
FIG. 17 is an enlarged side view conceptually showing a positional relation between the pressing sections of the presser spring.

In the presser spring 52, base end positions 54d, 54d . . . , which become elastically deformable base ends, are deformed at at least some of the pressing sections 54, 54 . . . to provide different elastic deformability with respect to the section to be attached 53 (see FIG. 17). That is, pressing forces against the disk-shaped recording media 100, 100 . . . are set such that the pressing sections 54, 54 . . . disposed at an upper side have pressing forces smaller than those of the pressing sections 54, 54 . . . disposed at a lower side.

Figure 18:
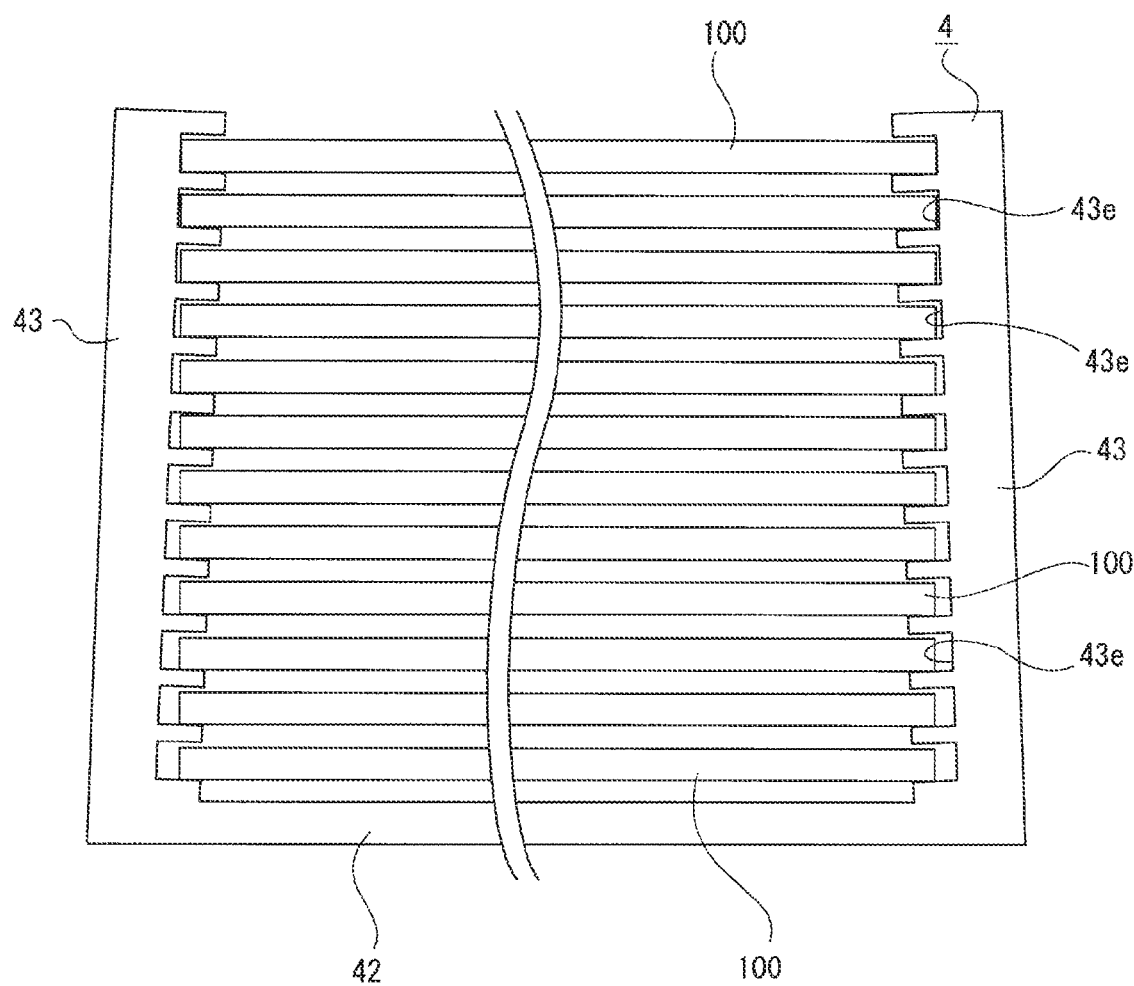
FIG. 18 is a front view conceptually showing a state of the second shell and the disk-shaped recording media.

As described above, the second shell 4 has the basal surface section 42 and the side surface sections 43 and 43, which are integrally formed of a resin material, and, in the second shell 4 in a formed state, the side surface sections 43 and 43 are configured to be easily inclined in a direction approaching each other (see FIG. 18). In addition, FIG. 18 shows a formed state of the side surface sections 43 and 43 exaggerated for the convenience of understanding. Accordingly, a holding force by the side surface sections 43 and 43 of the disk-shaped recording media 100, 100 . . . having the outer circumferential section inserted and held in the holding grooves 45e, 45e . . . is reduced as it goes downward.

Here, as described above, as pressing forces against the disk-shaped recording media 100, 100 . . . are set such that the pressing forces of the pressing sections 54, 54 . . . disposed at an upper side are smaller than those of the pressing sections 54, 54 . . . disposed at a lower side, forces of pressing the disk-shaped recording media 100, 100 . . . by the pressing sections 54, 54 . . . are set such that the forces of the upper side are smaller than those of the lower side.

Accordingly, a sum of holding forces by the side surface sections 43 and 43 and pressing forces by the pressing sections 54, 54 . . . can be substantially uniform in the disk-shaped recording media 100, 100 . . . , and a stable receiving state of the respective disk-shaped recording media 100, 100 . . . in the case body 2 can be secured.

A bridge member 55 is attached between the side surface sections 43 and 43 of the second shell 4 (see FIGS. 2 and 10).

The bridge member 55 is formed by bending a plate-shaped metal material in a predetermined shape, and constituted by a bridge section 55a extending leftward and rightward, bending sections 55b and 55b formed by bending both of left and right end sections of the bridge section 55a downward, and surface sections to be attached 55c and 55c formed by bending lower edges of the bending sections 55b and 55b outward.

In the bridge member 55, a thickness of the bridge section 55a is equal to a depth of the step surfaces 45d and 45d formed at the inner sidewall sections 45 and 45 of the second shell 4.

Figure 19:
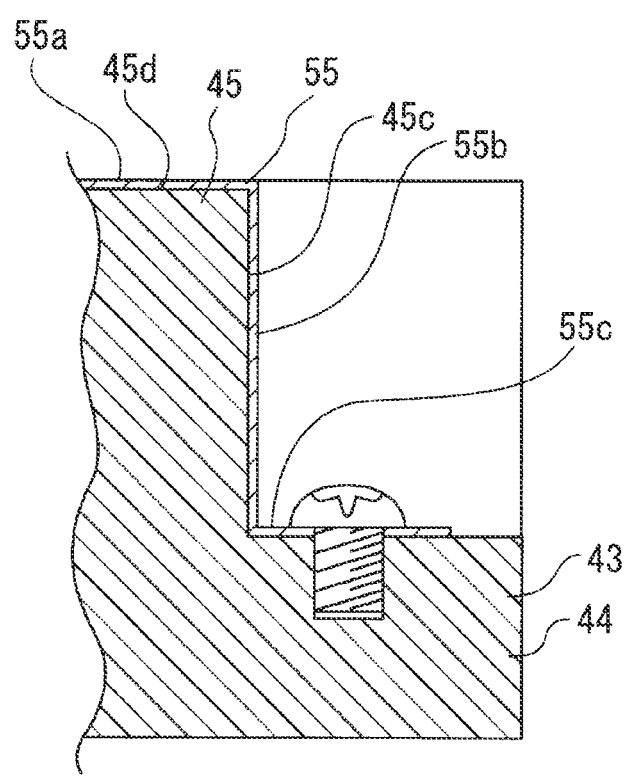
FIG. 19 is an enlarged cross-sectional view showing a state in which the bridge member is attached to the second shell.

In the bridge member 55, the bending sections 55b and 55b and the surface sections to be attached 55c and 55c are inserted into the attachment holes 45c and 45c of the inner sidewall sections 45 and 45 and the surface sections to be attached 55c and 55c are attached to the second shell 4 by fastening screws or the like. In a state in which the bridge member 55 is attached to the second shell 4, as shown in FIGS. 11 and 19, both of left and right end sections of the bridge section 55a are disposed at the step surfaces 45d and 45d of the inner sidewall sections 45 and 45, and the upper surface of the bridge section 55a and upper surfaces of the inner sidewall sections 45 and 45 except for the step surfaces 45d and 45d are disposed on the same plane.

As described above, the second shell 4 has the thin section 42a formed at the central section in the leftward and rightward directions of the basal surface section 42, and the bridge member 55 is attached between the side surface sections 43 and 43.

As the thin section 42a is formed at the central section in the leftward and rightward directions of the basal surface section 42 as described above, while high strength of a portion of the basal surface section 42 except for the thin section 42a is secured not to easily cause deformation and stress can be easily concentrated on the thin section 42a, since the side surface sections 43 and 43 are connected by the bridge member 55, high strength can be secured throughout the entire second shell 4.

In addition, since the side surface sections 43 and 43 are connected by the bridge member 55, a distance between the side surface sections 43 and 43 is constantly held, and positional accuracy of the holding grooves 45e, 45e . . . formed at the side surface sections 43 and 43 is improved. Accordingly, positional accuracy of the disk-shaped recording media 100, 100 . . . held in the holding grooves 45e, 45e . . . can be improved, and a good holding state of the disk-shaped recording media 100, 100 . . . can be secured.

Further, the second shell 4 is formed of a resin material, and the bridge member 55 is formed of a metal material. Accordingly, formability of the second shell 4 can be improved, and further improvement of strength of the entire second shell 4 and further improvement of positional accuracy of the side surface sections 43 and 43 can be attempted.

In the disk cartridge 1 constituted as described above, the disk-shaped recording media 100, 100 . . . are held in the case body 2 (see FIG. 2). In a state in which the first shell 3 and the second shell 4 are separated, an outer circumferential section of the disk-shaped recording medium 100 is inserted from a front side thereof into holding grooves 45e and 45e formed in the side surface sections 43 and 43 of the second shell 4 and held in the case body 2. Accordingly, an opening of the second shell 4 disposed at a front end thereof is formed as a disk insertion/extraction port 4a configured to perform insertion and extraction of the disk-shaped recording media 100, 100 . . . with respect to the second shell 4.

In a state in which the first shell 3 and the second shell 4 are coupled and the opening/closing panel 37 is attached to the first shell 3 to constitute the case body 2, insertion grooves 2a and 2a extending forward and rearward are formed between lower surfaces of the side surface sections 8 and 8 of the first shell 3 and upper surfaces of the outer sidewall sections 44 and 44 of the second shell 4 (see FIG. 1). In the insertion grooves 2a and 2a, rear ends are connected to the slider support sections 3a and 3a of the first shell 3, and front ends are connected to the insertion notches 38b and 38b formed in the panel section 38 of the opening/closing panel 37.

[Engagement Operation and Disengagement Operation of Disk Cartridge]

Hereinafter, an engagement operation and a disengagement operation of the disk cartridge 1 will be described (see FIGS. 20 to 31).

First, a state in which the first shell 3 and the second shell 4 are coupled will be described (see FIGS. 20 to 22).

The first shell 3 and the second shell 4 are coupled in a state in which the base surface section 7 of the base body 5 and the basal surface section 42 are opposite to each other upward and downward.

In a state in which the first shell 3 and the second shell 4 are coupled, the insertion protrusions 45f and 45f formed at the inner sidewall section 45 of the second shell 4 are inserted into the insertion concave sections 3b and 3b formed by the concave sections 10a and 10a and the concave sections 6a and 6a of the first shell 3. Here, the positioning protrusions 48 and 48 of the second shell 4 are inserted into the positioning concave sections 21 and 21 of the first shell 3, and positioning of the first shell 3 and the second shell 4 is performed.

In a state in which the first shell 3 and the second shell 4 are coupled, the first shell 3 and the second shell 4 are locked by the lock levers 24 and 24 and the lock sliders 31 and 31.

The lock levers 24 and 24 are disposed at a pivot end in a (outward) direction in which the locking protrusions 26a and 26a are spaced apart from each other by the biasing forces of the biasing springs 30 and 30 (see FIGS. 20 and 21), and the locking protrusions 26a and 26a are inserted into and engaged with the first locking concave sections 45a and 45a formed in the side surface sections 43 and 43 of the second shell 4. Here, the first locking concave sections 45a and 45a are closed by the locking protrusions 26a and 26a with no gap.

Figure 20:
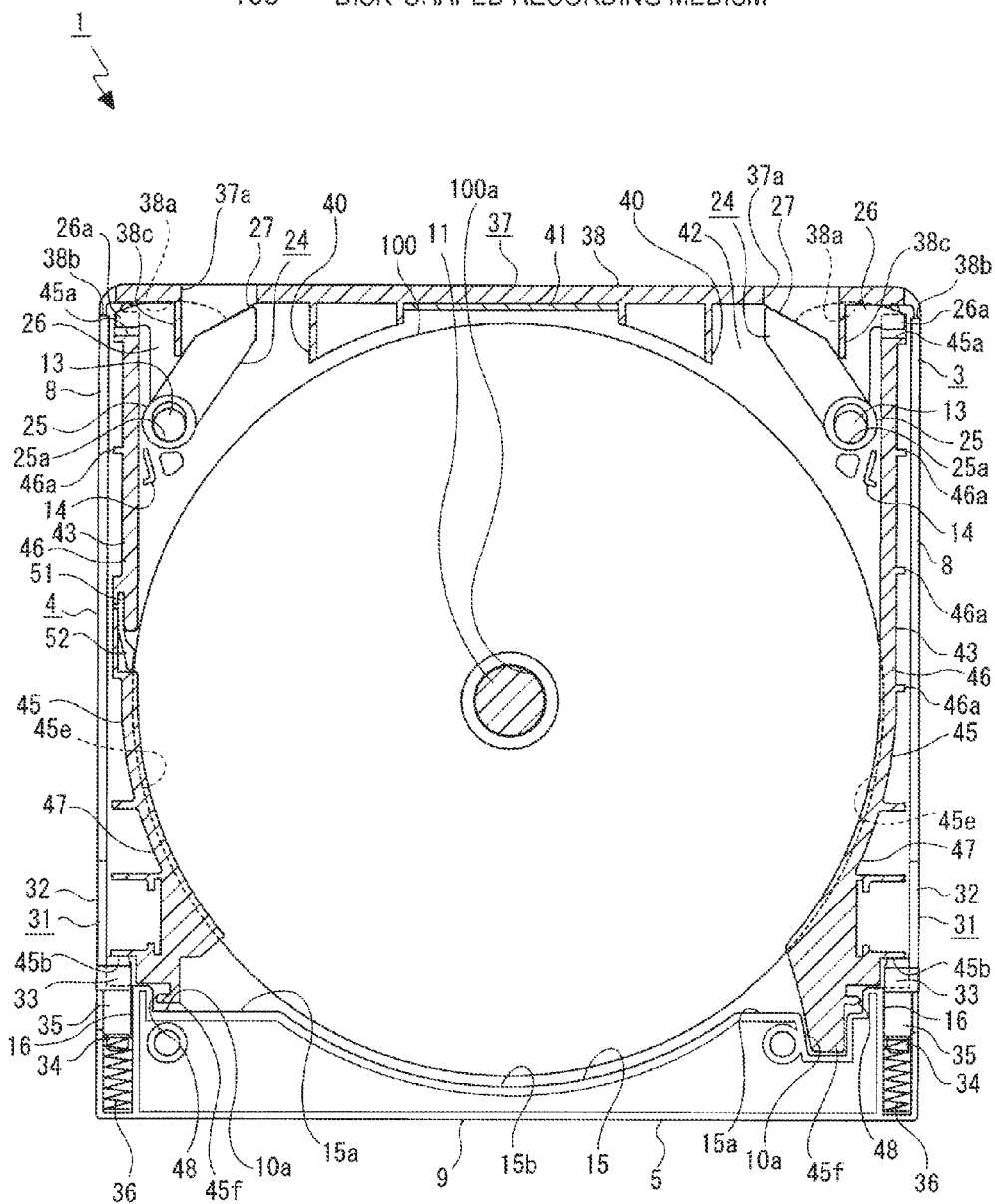
FIG. 20 is an enlarged cross-sectional view showing a state in which the disk-shaped recording medium is positioned and held on a regular position.
Figure 22:
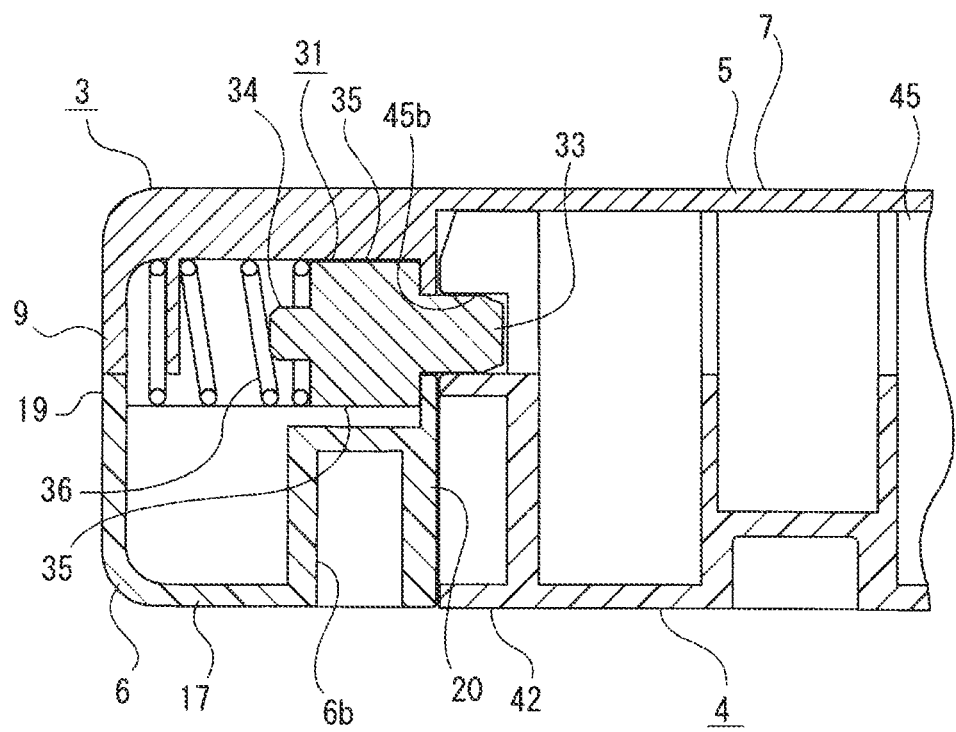
FIG. 22 is an enlarged cross-sectional view showing a state in which the first shell and the second shell are locked by the lock slider.

The lock sliders 31 and 31 are biased by the biasing forces of the coil springs 36 and 36, and front surfaces of the protrusion shaped sections 35 and 35 come in contact with a surface of the side surface section 43 directed rearward to be disposed at a moving end of a front side (see FIGS. 20 and 22). In the lock sliders 31 and 31, the lock sections 33 and 33 are inserted into and engaged with the second locking concave sections 45b and 45b formed at the side surface sections 43 and 43 of the second shell 4.

In a state in which the first shell 3 and the second shell 4 are coupled and locked and the disk-shaped recording media 100, 100 . . . are held in the case body 2 as described above, the pressing sections 54, 54 . . . of the presser spring 52 come in contact with and are pressed against portions of the outer circumferential surfaces of the disk-shaped recording media 100, 100 . . . (see FIG. 20). Here, in the holding grooves 45e, 45e . . . , the other portions in the outer circumferential surfaces of the disk-shaped recording media 100, 100 . . . are pushed against portions formed at arc-shaped surface sections 47 and 47 of the side surface sections 43 and 43, and the disk-shaped recording media 100, 100 . . . are positioned at regular positions in the case body 2.

In a state in which the disk-shaped recording media 100, 100 . . . are positioned at the regular positions, the restriction section 15b of the outer wall 15 formed at the reinforcement section 10 of the first shell 3 or the restriction section 20b of the front surface plate 20 formed at the auxiliary base 6 is disposed in the vicinity of a portion of the outer circumferential surface of the disk-shaped recording medium 100 near the rear end.

As described above, since the plurality of pressing sections 54, 54 . . . of the presser spring 52 are installed and spaced apart in a direction in which the disk-shaped recording media 100, 100 . . . are disposed in parallel, pressing forces can be applied to the disk-shaped recording media 100, 100 . . . , and a stable receiving state of the disk-shaped recording media 100, 100 . . . in the case body 2 can be secured.

Figure 23:
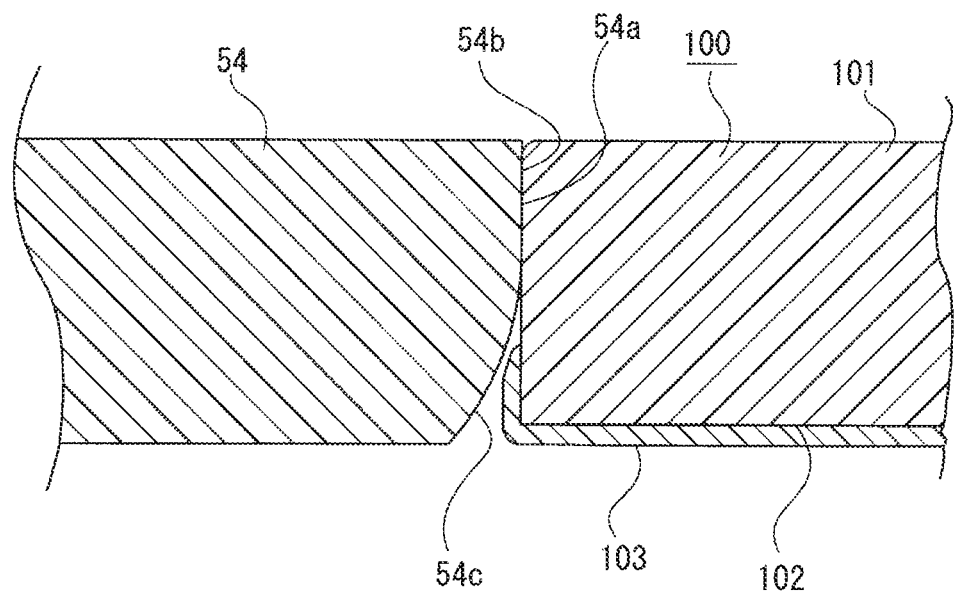
FIG. 23 is an enlarged cross-sectional view showing a state in which the pressing section of the presser spring comes in contact with an outer circumferential surface of the disk-shaped recording medium.

For example, the disk-shaped recording medium 100 has a substrate 101 and a cover layer 103 configured to protect a recording surface 102 formed on a lower surface of the substrate 101 (see FIG. 23). The cover layer 103 is formed to go around and cut into a portion of the outer circumferential surface from the lower surface of the substrate 101 in processing.

In a state in which the disk-shaped recording medium 100 is pushed against the pressing section 54, the contact section 54b of the pressing section 54 comes in line contact with a portion except for the lower end section of the outer circumferential surface of the disk-shaped recording medium 100, i.e., a portion at which the cover layer 103 is not formed.

In this way, since the pressing section 54 comes in contact with the portion except for the cover layer 103 of the disk-shaped recording medium 100, distortion may not easily occur from the recording surface 102 and an appropriate recording/reproducing operation of the disk-shaped recording medium 100 can be secured.

In addition, since the contact section 54b of the pressing section 54 comes in line contact with the outer circumferential surface of the disk-shaped recording medium 100, a stably pressed state of the disk-shaped recording medium 100 can be secured and generation of distortion of the recording surface 102 can be suppressed.

Figure 21:
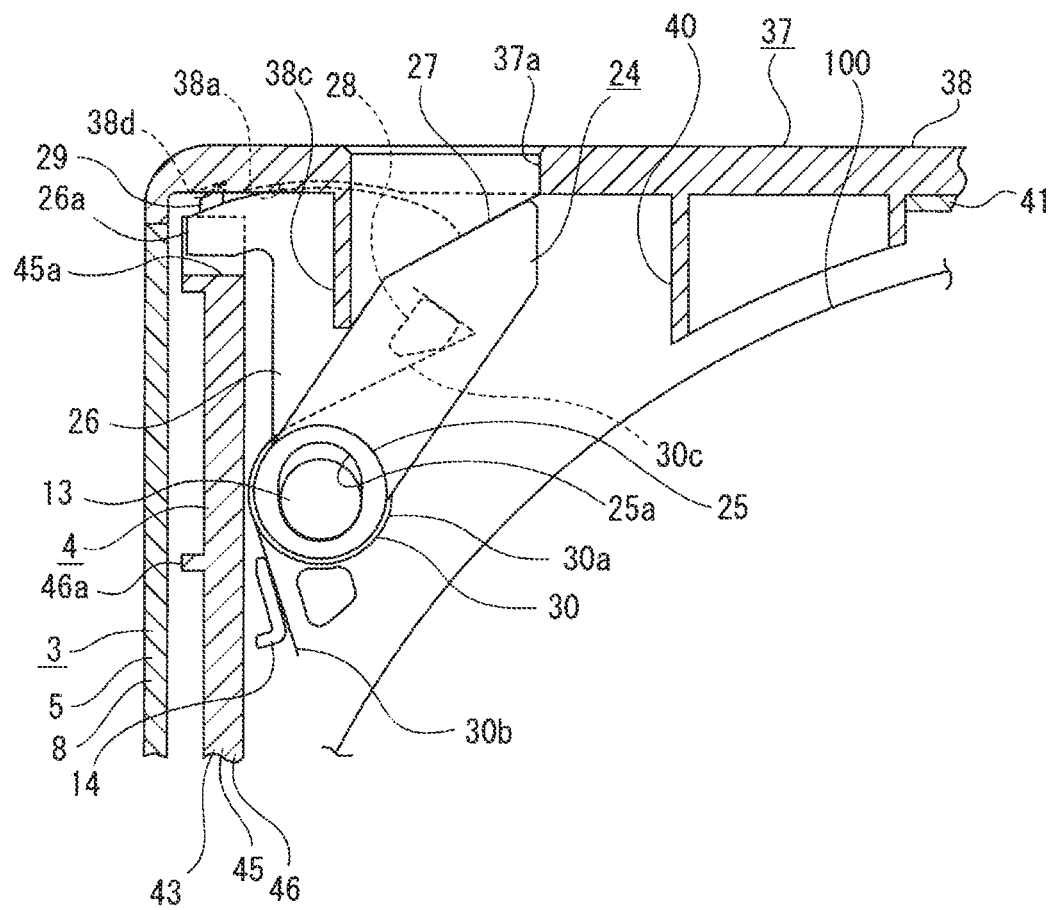
FIG. 21 is an enlarged cross-sectional view showing a state in which the first shell and the second shell are locked by the lock lever.

In a state in which the first shell 3 and the second shell 4 are coupled, the lock release sections 27 and 27 of the lock levers 24 and 24 are pushed against the inclined surfaces of the protrusions to be inserted 38c and 38c of the opening/closing panel 37 from a rear side thereof by the biasing forces of the biasing springs 30 and 30 (see FIG. 21).

In addition, in a state in which the first shell 3 and the second shell 4 are coupled, the locking protrusions 26a and 26a of the lock sections 26 and 26 of the lock levers 24 and 24 are inserted into the first locking concave sections 45a and 45a formed at the side surface sections 43 and 43 of the second shell 4, and the first locking concave sections 45a and 45a are closed by the locking protrusions 26a and 26a.

Here, the engaging protrusions 29 and 29 are engaged with opening edges of the engaging grooves 38d and 38d formed in the panel section 38 of the opening/closing panel 37. Accordingly, even when a force in a direction in which the locking protrusions 26a and 26a are extracted from the first locking concave sections 45a and 45a is applied to the lock levers 24 and 24 by vibrations or the like, a locked state of the first shell 3 and the second shell 4 can be held without unnecessary pivotal movement of the lock levers 24 and 24.

Since the lock sections 26 and 26 have the locking protrusions 26a and 26a formed in a tapered shape, the locking protrusions 26a and 26a can be easily adhered to the opening edges of the first locking concave sections 45a and 45a and sealability in the case body 2 can be improved.

In a state in which the first shell 3 and the second shell 4 are coupled, the center pin 11 formed at the first shell 3 is inserted into central holes 100a and 100a . . . of the disk-shaped recording media 100, 100 . . . (see FIG. 20). Here, the inner surface of the panel section 38 of the opening/closing panel 37 is disposed in the vicinity of the front ends of the disk-shaped recording media 100, 100 . . .

Figure 24:
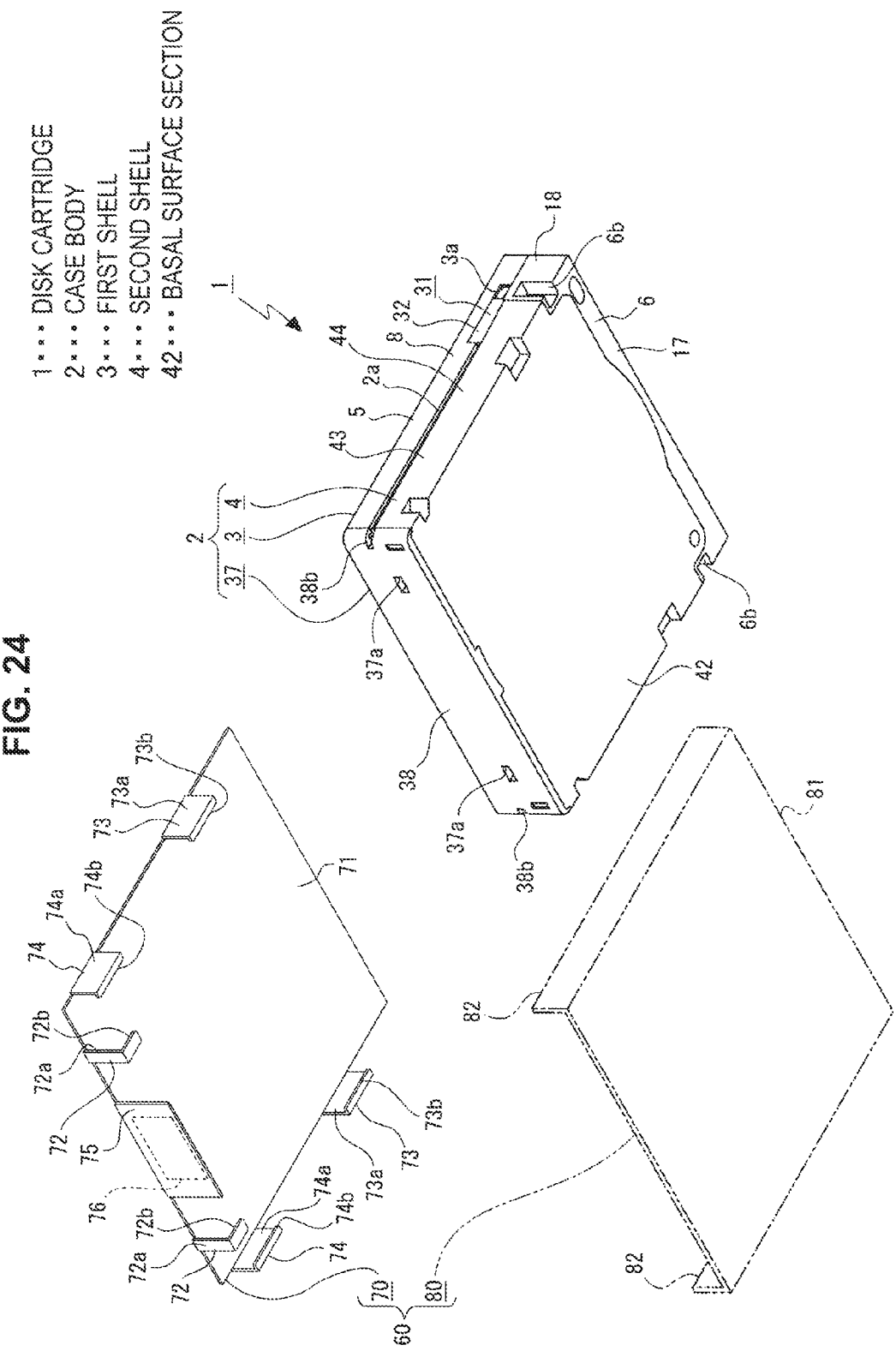
FIG. 24 is a perspective view showing the disk cartridge and a holding mechanism.

In a state in which the first shell 3 and the second shell 4 are coupled as described above, for example, the disk cartridge 1 is inserted from the cartridge insertion/extraction port (not shown) of the disk changer to hold a holding mechanism 60 installed at the disk changer (see FIG. 24).

The holding mechanism 60 has a first case holding section 70 and a second case holding section 80. In addition, FIG. 24 and so on show schematic configurations of the first case holding section 70 and the second case holding section 80.

The first case holding section 70 is configured such that necessary parts are formed at a holding base 71 directed in the upward and downward directions and having a rectangular plate shape.

Release pressing pieces 72 and 72 protruding downward and spaced apart from each other leftward and rightward are formed at a front edge of the holding base 71. The release pressing piece 72 is constituted by a coupling section 72a connected to the holding base 71 and directed in the forward and rearward directions, and a pressing section 72b protruding rearward from a lower edge of the coupling section 72a.

Lock release pieces 73 and 73 protruding downward are formed at positions around rear ends disposed at both of left and right edges of the holding base 71. The lock release piece 73 is constituted by a coupling section 73a connected to the holding base 71 and directed in the leftward and rightward directions, and a release section 73b protruding inward from a lower edge of the coupling section 73a.

Auxiliary pieces 74 and 74 protruding downward are formed at positions around front ends of both of left and right edges of the holding base 71. The auxiliary piece 74 is constituted by a coupling section 74a connected to the holding base 71 and directed in the leftward and rightward directions, and an insertion section 74b protruding inward from a lower edge of the coupling section 74a.

A protrusion surface section 75 protruding downward is formed at a front edge of the holding base 71. The protrusion surface section 75 is disposed between the release pressing pieces 72 and 72, and an adsorption section 76 having a flat plate shape is attached to a rear surface of the protrusion surface section 75. In addition, when the magnetic plate 41 is attached to the opening/closing panel 37 of the disk cartridge 1, a magnet is used as the adsorption section 76, and when the magnet is attached to the opening/closing panel 37, a magnetic plate or a magnet is used as the absorption section 76.

For example, the second case holding section 80 has a bottom wall section 81 directed in the upward and downward directions and having a rectangular plate shape, and sidewall sections 82 and 82 protruding upward from both of left and right edges of the bottom wall section 81. A plurality of holding pieces (not shown) are formed at the second case holding section 80.

As shown in FIG. 24, when the disk cartridge 1 is inserted from the cartridge insertion/extraction port of the disk changer, the release sections 73*b* and 73*b* of the lock release pieces 73 and 73 and the insertion sections 74*b* and 74*b* of the auxiliary pieces 74 and 74 in the first case holding section 70 are inserted into the insertion grooves 2*a* and 2*a*. In addition, in the drawings after FIG. 25, the second case holding section 80 is not shown.

Figure 26:
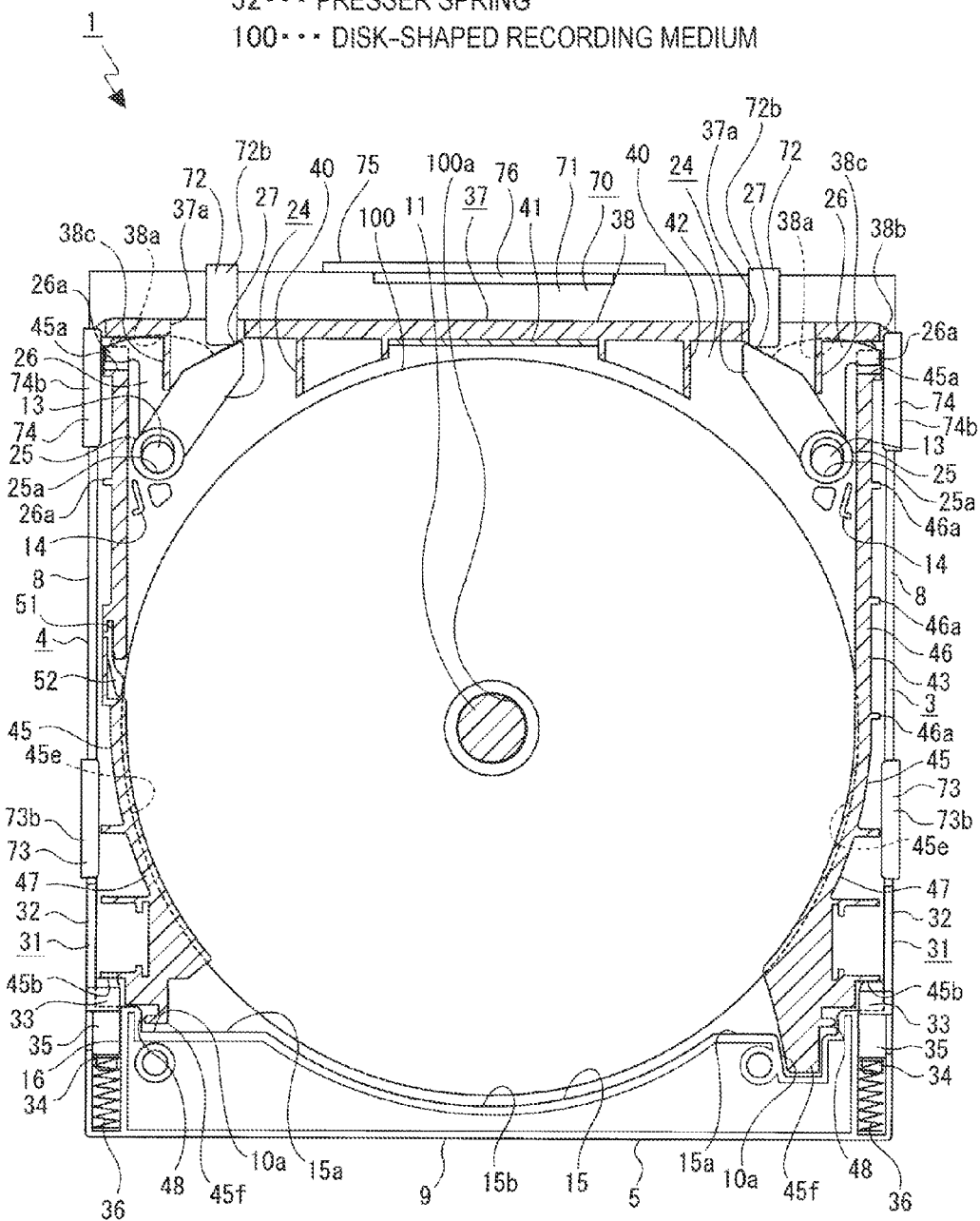
FIG. 26 is a cross-sectional view showing a state just before the locking of the first shell and the second shell is released by the holding mechanism.
Figure 27:
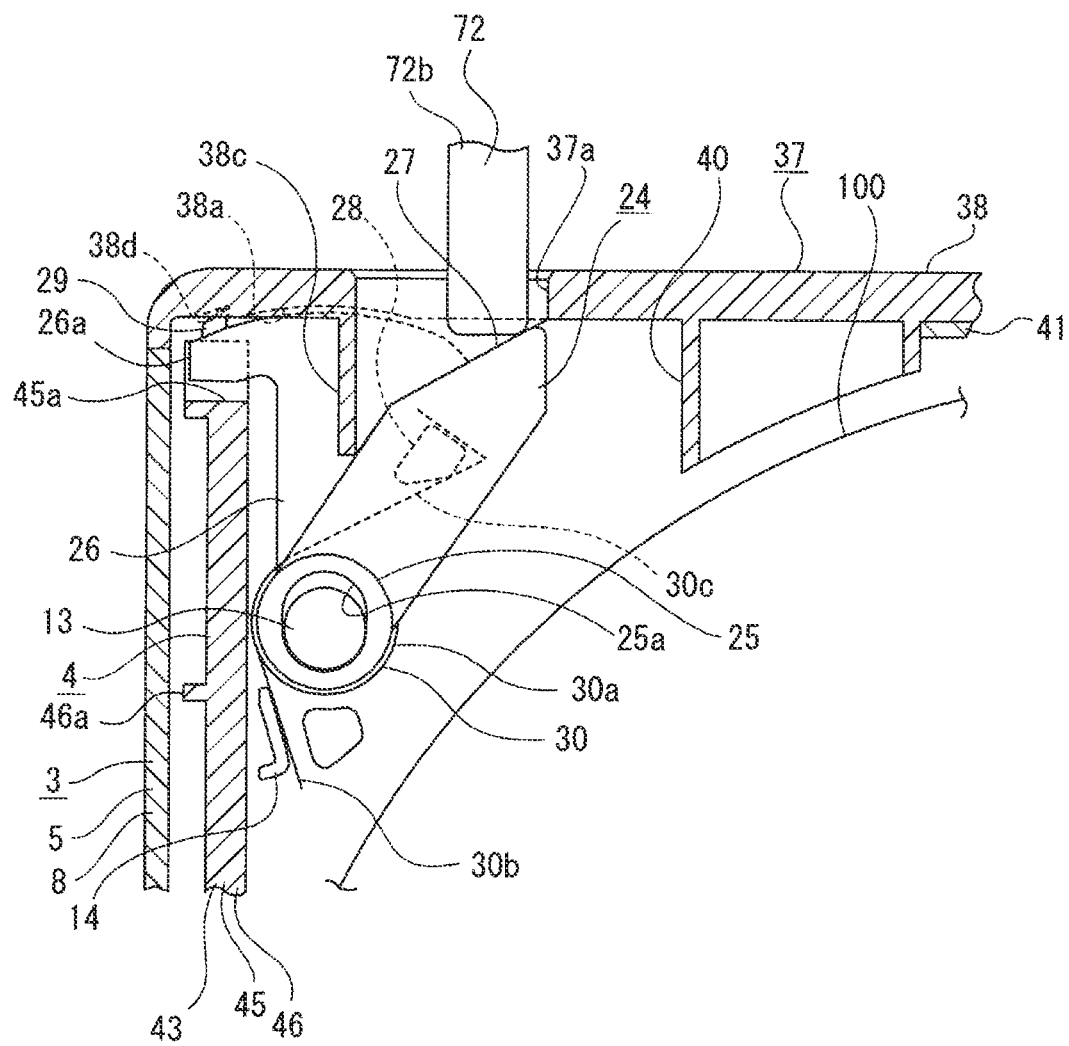
FIG. 27 is an enlarged cross-sectional view showing a state just before the locking of the first shell and the second shell is released by the holding mechanism.

Further, when the disk cartridge 1 is inserted from the cartridge insertion/extraction port, the pressing sections 72*b* and 72*b* of the release pressing pieces 72 and 72 in the first case holding section 70 are inserted into the insertion holes 37*a* and 37*a* of the opening/closing panel 37 (see FIGS. 26 and 27).

Figure 28:
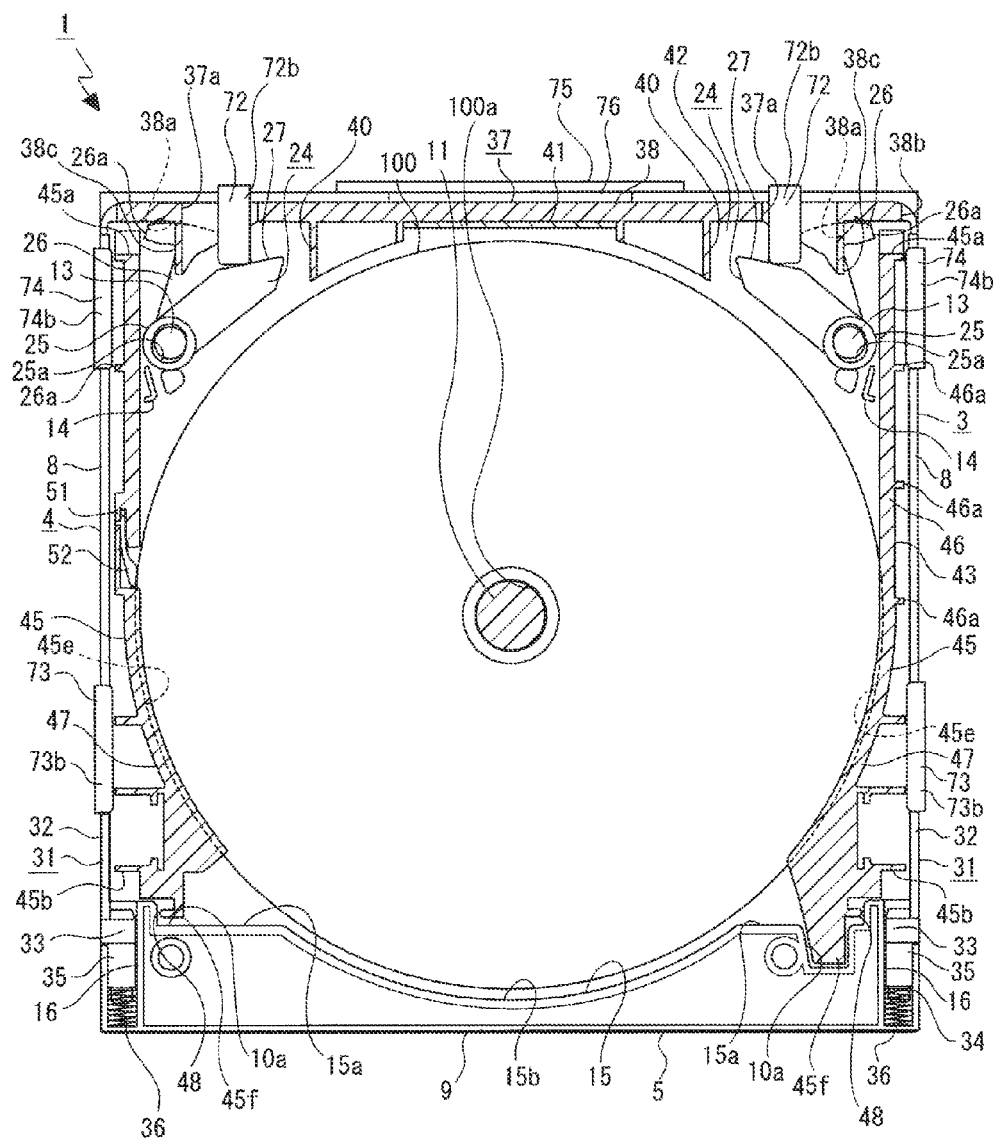
FIG. 28 is a cross-sectional view showing a state in which the locking of the first shell and the second shell is released by the holding mechanism.
Figure 29:
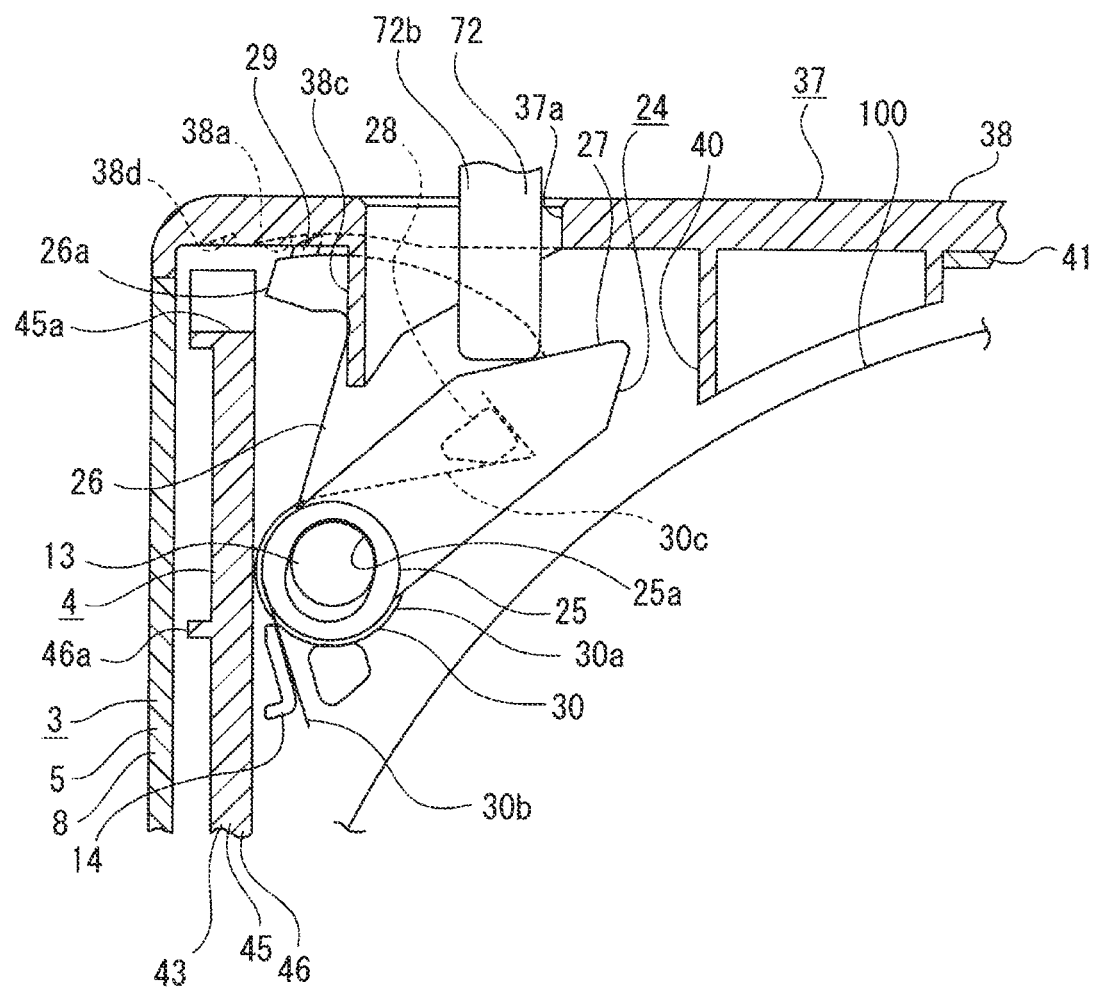
FIG. 29 is an enlarged cross-sectional view showing a state in which the locking of the first shell and the second shell is released by the holding mechanism.

When the pressing section 72*b* of the release pressing piece 72 is inserted into an insertion hole 37*a* of the opening/closing panel 37, the lock release section 27 of the lock lever 24 is pressed rearward by the pressing section 72*b* (see FIGS. 28 and 29).

The lock lever 24 has an elliptical cross-sectional shape perpendicular to the axial direction of the hole to be inserted 25*a*, and the support shaft 13 has a circular cross-sectional shape perpendicular to the axial direction. Accordingly, when the lock release section 27 of the lock lever 24 is pressed rearward by the pressing section 72*b*, the lock lever 24 is moved rearward with respect to the support shaft 13 and engagement of the engaging protrusion 29 with respect to an engaging groove 38*d* formed in the opening/closing panel 37 is released so that the lock lever 24 is configured to be a pivotable state.

The lock lever 24 is pivoted by the pressing section 72*b* against the biasing force of the biasing spring 30, the locking protrusion 26*a* of the lock section 26 is extracted from the first locking concave section 45*a* of the second shell 4, and the locking of the first shell 3 and the second shell 4 by the lock lever 24 is released.

Figure 30:
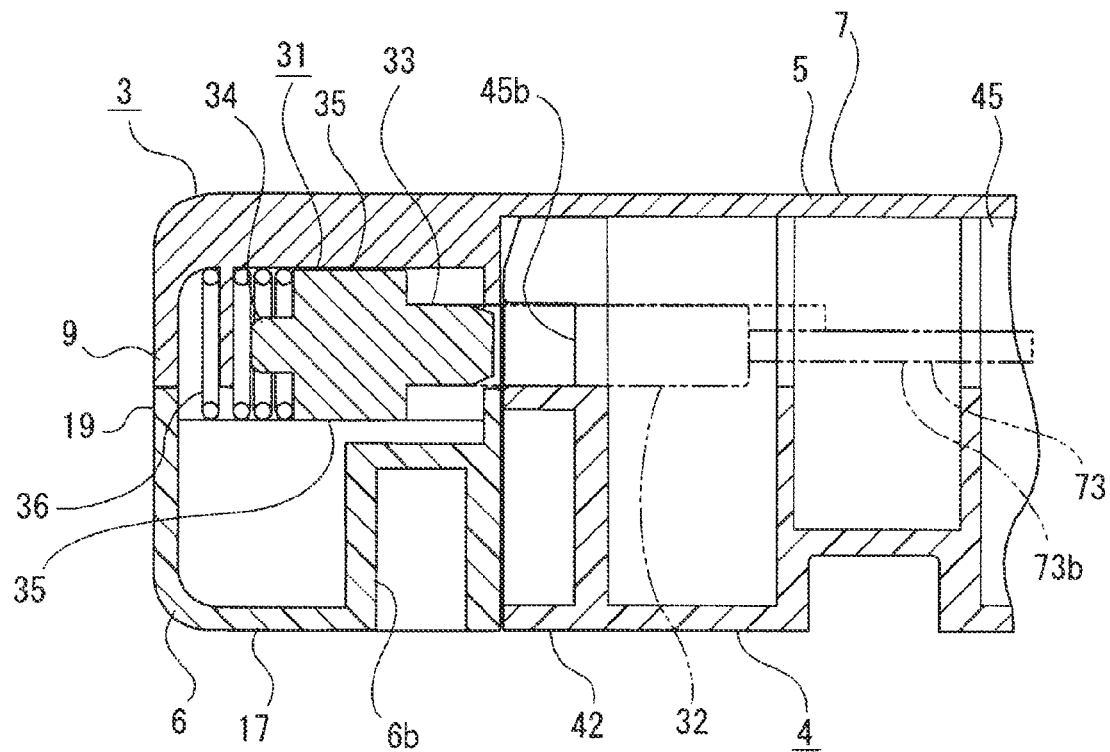
FIG. 30 is an enlarged cross-sectional view showing a state in which the locking by the lock slider is released by the holding mechanism.
Figure 31:
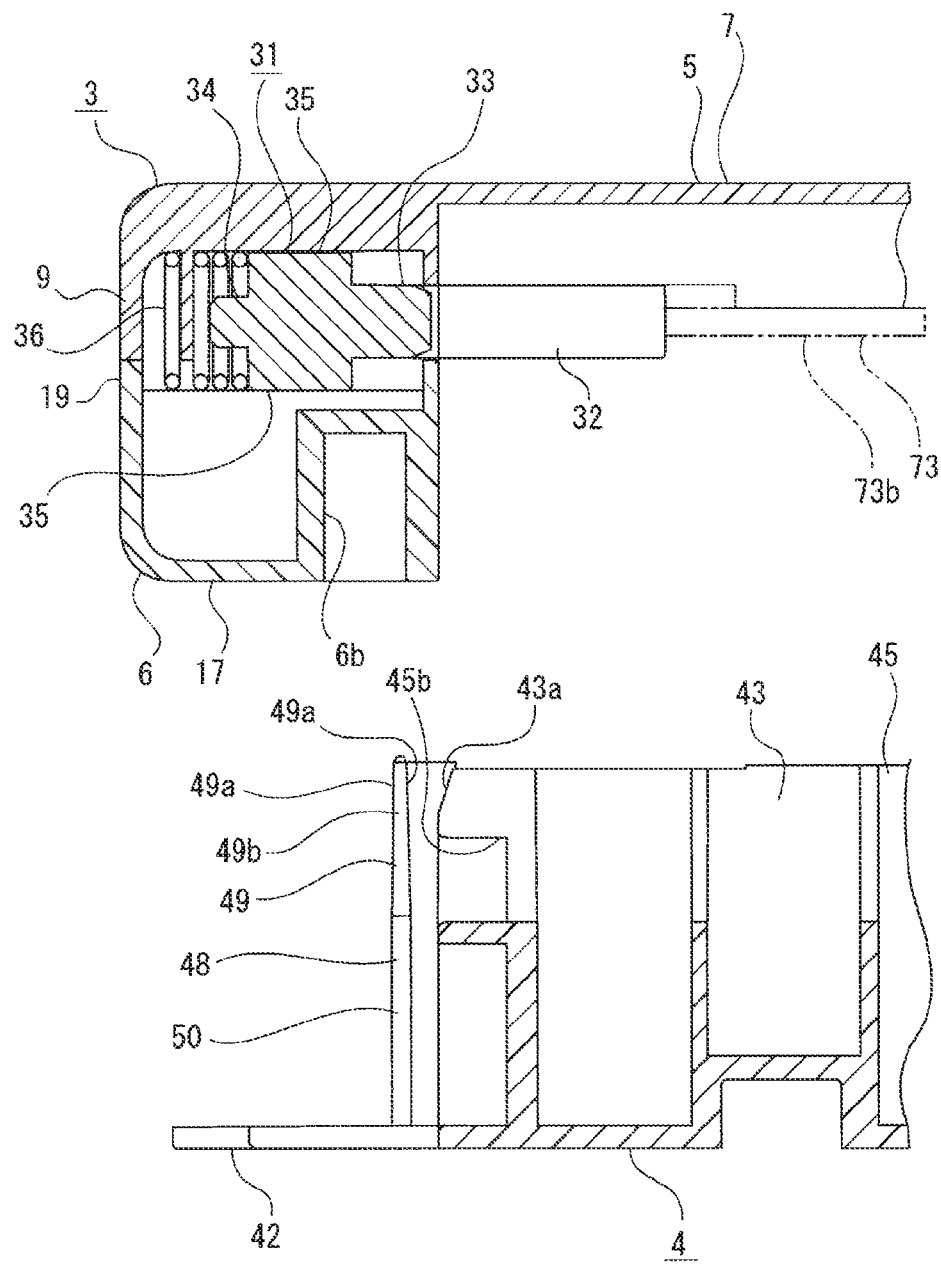
FIG. 31 is an enlarged cross-sectional view showing a state in which the locking by the lock slider is released by the holding mechanism and the first shell and the second shell are separated.

In addition, when the lock release piece 73 is inserted into an insertion groove 2*a* and the section to be supported 32 of the lock slider 31 is pressed by the release section 73*b*, the lock slider 31 is moved rearward against the biasing force of the coil spring 36 and the lock section 33 is extracted from the second locking concave section 45*b* of the second shell 4 (see FIG. 30). When the lock section 33 is extracted from the second locking concave section 45*b*, the locking of the first shell 3 and the second shell 4 by the lock slider 31 is released. The release of the lock of the first shell 3 and the second shell 4 by the lock slider 31 and the release of the lock of the first shell 3 and the second shell 4 by the lock lever 24 are simultaneously performed.

When the locking of the first shell 3 and the second shell 4 by the lock levers 24 and 24 and the lock sliders 31 and 31 is released, the first shell 3 is held in the first case holding section 70. In addition, here, simultaneously, a holding piece of the second case holding section 80 is engaged with each predetermined part of the second shell 4, and the second shell 4 is held in the second case holding section 80.

In the first shell 3, the magnetic plate 41 attached to the opening/closing panel 37 is adsorbed to the adsorption section 76 attached to the protrusion surface section 75 of the first case holding section 70, and the disk cartridge 1 is held in an insertion end in front of the first case holding section 70.

As described above, as the magnetic plate 41 is attached to the opening/closing panel 37, the magnetic plate 41 is adsorbed to the adsorption section 76, and the first shell 3 is held in the first case holding section 70 without generation of shaking. Accordingly, a stable holding state of the first shell 3 with respect to the first case holding section 70 can be secured, and in the held state, positional accuracy of the first shell 3 with respect to the first case holding section 70 can be improved.

In addition, an adsorption force of the adsorption section 76 with respect to the magnetic plate 41 is reduced in proportion to a square of a distance therebetween. Accordingly, as described above, as the magnetic plate 41 is attached to the inner surface of the opening/closing panel 37, a force when the first shell 3 is extracted rearward from the first case holding section 70 can be reduced, and a holding state of the first shell 3 with respect to the first case holding section 70 can be easily released.

As described above, as the lock of the first shell 3 and the second shell 4 by the lock levers 24 and 24 and the lock sliders 31 and 31 is released, the first shell 3 is held in the first case holding section 70 and the second shell 4 is held in the second case holding section 80, the first shell 3 and the second shell 4 are separable in the upward and downward directions.

In a state in which the first shell 3 and the second shell 4 are separable in the upward and downward directions, for example, when the second shell 4 is moved downward according to downward movement of the second case holding section 80 (see FIG. 31), the received disk-shaped recording medium 100 is extracted from the case body 2 by an extraction mechanism (not shown).

In a state in which the first shell 3 and the second shell 4 are separated as described above, for example, as the second shell 4 is moved upward to approach the first shell 3 according to upward movement of the second case holding section 80, the first shell 3 and the second shell 4 can be coupled to each other.

When the second shell 4 is moved upward, the positioning protrusions 48 and 48 of the second shell 4 are inserted into the positioning concave sections 21 and 21 of the first shell 3, and the insertion protrusions 45*f* and 45*f* formed at the inner sidewall section 45 of the second shell 4 are inserted into the insertion concave sections 3*b* and 3*b* formed by the concave sections 10*a* and 10*a* and the concave sections 6*a* and 6*a* of the first shell 3.

When the first shell 3 and the second shell 4 are coupled, the lock levers 24 and 24 are held at a pivot position at which the lock is released, and the lock sliders 31 and 31 are held at a moving position at which the lock is released (see FIGS. 29 and 30).

When the second shell 4 is moved upward to come in contact with the first shell 3 to move both of the first shell 3 and second shell 4 rearward, the pressing against the lock release sections 27 and 27 by the pressing sections 72*b* and 72*b* of the release pressing pieces 72 and 72 is released, and the lock levers 24 and 24 are pivoted by the biasing forces of the biasing springs 30 and 30. Accordingly, the locking protrusions 26*a* and 26*a* of the lock sections 26 and 26 are inserted into and engaged with the first locking concave sections 45a and 45a of the second shell 4, and the lock of the first shell 3 and the second shell 4 by the lock levers 24 and 24 is performed.

In addition, when the second shell 4 is moved upward to come in contact with the first shell 3 to move both of the first shell 3 and second shell 4 rearward, the pressing against the sections to be supported 32 and 32 by the release sections 73b and 73b of the lock release pieces 73 and 73 is released, and the lock sliders 31 and 31 are moved forward by the biasing forces of the coil springs 36 and 36. Accordingly, the lock sections 33 and 33 are inserted into and engaged with the second locking concave sections 45b and 45b of the second shell 4, and the lock of the first shell 3 and the second shell 4 by the lock sliders 31 and 31 is performed.

[Conclusion]

As described above, in the disk cartridge 1, the positioning concave sections 21 and 21 and the positioning protrusions 48 and 48 configured to determine relative positions of both of the first shell 3 and the second shell 4 in the first direction and the second direction when the relative positions of both of the first shell 3 and the second shell 4 in the first direction and the second direction are allowed and coupled upon separation are formed at the first shell 3 and the second shell 4, respectively.

Accordingly, even when positional deviation occurs in a state in which the first shell 3 and the second shell 4 are held in the first case holding section 70 and the second case holding section 80, respectively, the positioning protrusions 48 and 48 can be inserted into the positioning concave sections 21 and 21 to perform relative positioning of both of the first shell 3 and the second shell 4 when the engagement operation of the first shell 3 and the second shell 4 is performed, and an appropriate coupling state of the first shell 3 and the second shell 4 can be secured.

[Present Technology]

Additionally, the present technology may also be configured as below.

(1)

A disk cartridge including:
 a case body in which a plurality of disk-shaped recording media are configured to be able to be received in an axial direction of a central shaft in parallel, and a first shell having a base surface section parallel to a recording surface of the disk-shaped recording medium and a second shell having a basal surface section parallel to the recording surface of the disk-shaped recording medium are coupled and separated through separation and connection in the axial direction; and
 a presser spring having a section to be attached, which is attached to the case body, and a pressing section configured to come in contact with an outer circumferential surface of the disk-shaped recording medium and to press the disk-shaped recording medium,
 wherein the presser spring is formed of a resin material.

(2)

The disk cartridge according to (1),
 wherein a plurality of the pressing sections are installed in a direction parallel to the disk-shaped recording media and spaced apart from each other, and the plurality of pressing sections are configured to be able to come in contact with the disk-shaped recording media, respectively.

(3)

The disk cartridge according to (2),
 wherein pressing forces of at least two pressing sections of the plurality of pressing sections applied to the disk-shaped recording media are configured to be different.

(4)

The disk cartridge according to any one of (1) to (3),
 wherein the pressing section is configured to come in contact with a portion of the disk-shaped recording medium other than a cover layer configured to cover the recording surface.

(5)

The disk cartridge according to any one of (1) to (4),
 wherein the pressing section is configured to come in line contact with the disk-shaped recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A disk cartridge comprising:
 a case body in which a plurality of disk-shaped recording media are configured to be received in an axial direction of a central shaft in parallel, and a first shell having a base surface section parallel to a recording surface of the plurality of disk-shaped recording media and a second shell having a basal surface section parallel to the recording surface of the plurality of disk-shaped recording media are coupled in the axial direction; and
 a presser spring comprising:
  a section to be attached, which is attached to the case body by inserting the section to be attached into an insertion attachment section formed on an inner surface of a first inner sidewall of the second shell; and
  a plurality of pressing sections, corresponding to each of the plurality of disk-shaped recording media, protruding from a first edge of the section to be attached, wherein the plurality of pressing sections are configured to come in contact with an outer circumferential surface of the corresponding plurality of disk-shaped recording media and to press the corresponding plurality of disk-shaped recording media.

2. The disk cartridge according to claim 1, wherein the plurality of pressing sections are installed in a direction parallel to the plurality of disk-shaped recording media and spaced apart from each other.

3. The disk cartridge according to claim 1, wherein pressing forces of at least two pressing sections of the plurality of pressing sections applied to the corresponding plurality of disk-shaped recording media are configured to be different.

4. The disk cartridge according to claim 1, wherein the plurality of pressing sections are configured to come in contact with a portion of the corresponding plurality of disk-shaped recording media other than a cover layer configured to cover the recording surface.

5. The disk cartridge according to claim 1, wherein the plurality of pressing sections are configured to come in line contact with the corresponding plurality of disk-shaped recording media.

6. The disk cartridge according to claim 1, wherein the presser spring is made of a resin material.

7. The disk cartridge according to claim 1, wherein shape of the section to be attached is an elongated plate.

8. The disk cartridge according to claim 1, wherein a plurality of holding grooves, corresponding to each of the plurality of disk-shaped recording media, are formed in an inner surface of the first inner side wall and an inner surface of a second inner side wall of the second shell.

9. The disk cartridge according to claim 8, wherein the plurality of holding grooves are disposed at positions in an upward and downward directions of the second shell at equal intervals.

10. The disk cartridge according to claim 9, wherein the plurality of pressing sections are vertically formed at the same interval as the plurality of holding grooves.

11. The disk cartridge according to claim 10, wherein a first pressing section of the plurality of pressing sections at an upper side has a pressing force smaller than the pressing force of a second pressing section at a lower side.

12. The disk cartridge according to claim 1, wherein a flat surface section inclined in a forward and rearward direction along a pressing section of the plurality of pressing sections is formed at a tip section of each of the plurality of pressing sections.

13. The disk cartridge according to claim 12, wherein a portion of the flat surface section is in line contact with the outer circumferential surface of the corresponding plurality of disk-shaped recording media.

14. The disk cartridge according to claim 12, wherein a lower end section of the flat surface section is formed as an inclined section displaced towards a rear surface of the pressing section.

15. The disk cartridge according to claim 1, wherein a protrusion concave section in communication with a rear end section of the insertion attachment section is formed the inner surface of the first sidewall of the second shell.

16. The disk cartridge according to claim 15, wherein each of the plurality of pressing sections are inserted into the protrusion concave section.

17. A disk cartridge comprising:
a case body in which a plurality of disk-shaped recording media are configured to be received in an axial direction of a central shaft in parallel, and a first shell having a base surface section parallel to a recording surface of the plurality of disk-shaped recording media and a second shell having a basal surface section parallel to the recording surface of the plurality of disk-shaped recording media are coupled in the axial direction;
a presser spring comprising:
  a section to be attached; and
  a plurality of pressing sections, corresponding to each of the plurality of disk-shaped recording media, protruding from a first edge of the section to be attached, wherein the plurality of pressing sections are configured to come in contact with an outer circumferential surface of the corresponding plurality of disk-shaped recording media and to press the corresponding plurality of disk-shaped recording media; and
a spring attachment concave section formed on an inner surface of a first inner sidewall of the second shell, wherein the spring attachment concave section comprises:
  an insertion attachment section opened in an upward direction, wherein the section is inserted into the insertion attachment section; and
  a protrusion concave section opened in an upward direction and in communication with a rear end section of the insertion attachment section, wherein each of the plurality of pressing sections are inserted into the protrusion concave section.

* * * * *